US008849017B2

(12) United States Patent
Ito et al.

(10) Patent No.: US 8,849,017 B2
(45) Date of Patent: Sep. 30, 2014

(54) IMAGE PROCESSING APPARATUS, IMAGE PROCESSING METHOD, PROGRAM, AND RECORDING MEDIUM FOR LEARNING FROM MOVING IMAGES

(75) Inventors: Masato Ito, Tokyo (JP); Kohtaro Sabe, Tokyo (JP); Jun Yokono, Tokyo (JP)

(73) Assignee: Sony Corporation, Tokyo (JP)

( * ) Notice: Subject to any disclaimer, the term of this patent is extended or adjusted under 35 U.S.C. 154(b) by 260 days.

(21) Appl. No.: 13/427,199

(22) Filed: Mar. 22, 2012

(65) Prior Publication Data

US 2012/0250982 A1 Oct. 4, 2012

(30) Foreign Application Priority Data

Mar. 31, 2011 (JP) ................. 2011-077696

(51) Int. Cl.
 G06K 9/62 (2006.01)
 G06T 7/00 (2006.01)
(52) U.S. Cl.
 CPC ..... *G06T 7/0042* (2013.01); *G06T 2207/20081* (2013.01); *G06T 2207/20144* (2013.01); *G06T 7/0083* (2013.01); *G06T 2207/20164* (2013.01); *G06T 7/0097* (2013.01)
 USPC ........................................................ 382/159
(58) Field of Classification Search
 USPC ........................................................ 382/159
 See application file for complete search history.

(56) References Cited

U.S. PATENT DOCUMENTS 7,024,054 B2 * 4/2006 Cahill et al. ................. 382/294
2012/0288186 A1 * 11/2012 Kohli et al. .................. 382/159

FOREIGN PATENT DOCUMENTS

JP 2003143473 A * 5/2003

OTHER PUBLICATIONS (Jiangjian Xiao, "Image Based View Synthesis", 2004, University of Central Florida, Orlando, FL).*
Michalis K. Titsias, et al., "Unsupervised Learning of Multiple Aspects of Moving Objects fro Video", School of Informatics, University of Edinburgh, Edinburgh EH1 2QL, UK.
Hao Su, et al., "Learning a Desnse Multi-view Representation for Detection, Viewpoint Classification and Synthesis of Object Categories", Dept. of Computer Science, Princeton Univeristy, et al.

* cited by examiner

*Primary Examiner* — Stephen R Koziol
*Assistant Examiner* — Totam Le
(74) *Attorney, Agent, or Firm* — Finnegan, Henderson, Farabow, Garrett & Dunner, L.L.P.

(57) ABSTRACT

An image processing apparatus includes: an image feature outputting unit that outputs each of image features in correspondence with a time of the frame; a foreground estimating unit that estimates a foreground image at a time s by executing a view transform as a geometric transform on a foreground view model and outputs an estimated foreground view; a background estimating unit that estimates a background image at the time s by executing a view transform as a geometric transform on a background view model and outputs an estimated background view; a synthesized view generating unit that generates a synthesized view by synthesizing the estimated foreground and background views; a foreground learning unit that learns the foreground view model based on an evaluation value; and a background learning unit that learns the background view model based on the evaluation value by updating the parameter of the foreground view model.

14 Claims, 26 Drawing Sheets

FOREGROUND ESTIMATION          BACKGROUND ESTIMATION

FOREGROUND ESTIMATION          BACKGROUND ESTIMATION

IMAGE PROCESSING APPARATUS, IMAGE PROCESSING METHOD, PROGRAM, AND RECORDING MEDIUM FOR LEARNING FROM MOVING IMAGES

BACKGROUND

The present technology relates to an image processing apparatus, an image processing method, a program, and a recording medium; and more particularly, to an image processing apparatus, an image processing method, a program, and a recording medium configured to execute learning image processing.

For example, pattern recognizing technologies used for fade recognition, object recognition the like have been suggested as currently commercially available techniques regarding learning image processing.

In the learning image, processing according to the related art, learning is executed after a label of a recognition target is granted to an abundance of image data as learning data, when a model of the recognition target is learned to form a recognizer.

For example, when an image is learned for face recognition, it is necessary to grant, as a label, information or the like used for specifying the name of a person, the orientation of his or her face, and a region where the facial image of the person is displayed. Further, when an image is learned for object recognition, it is necessary to grant, as a label, information or the like used for specifying the name of an object, the orientation of the object, and a region where the object is displayed.

Since the granting of the label is executed manually, it is difficult to prepare an abundance of learning data.

Accordingly, for example, there have been suggested learning image processing techniques of automatically learning the target model from a plurality of images including a moving image without granting a label as described above.

A method of automatically learning a foreground and background learning model has been suggested as an example of the leaning image processing in which the target model is automatically learned from a plurality of images including a moving image (for example, see "Unsupervised Learning of Multiple Aspects of Moving Objects from Video" by Michalis K. Titsias, Christopher K. I. Williams in Panhellenic Conference on Informatics 2005: 746-756).

Further, a method of automatically learning a multi-view target model corresponding to a foreground image has been suggested as another example of the leaning image processing in which the target model is automatically learned from a plurality of images including a moving image (for example, see "Learning a dense multi-view representation for detection, viewpoint classification and synthesis of object categories" by H. Su, M. Sun, L. Fei-Fei and S. Savarese in International Conference on Computer Vision (ICCV), 2009). A geometric relation between a plurality of views is modeled according to this method.

SUMMARY

In the technique disclosed in, for example, "Unsupervised Learning of Multiple Aspects of Moving Objects from Video", however, it is necessary to complete the learning for each view since a relevance or the like between the respective views of the multi-view is not modeled. For this reason, it is supposed that the learning, is difficult when the number of views increases when the multi-view is learned.

In the technology disclosed in "Learning a dense multi-view representation for detection, viewpoint classification and synthesis of object categories", when a background close to a foreground is included as in an actual moving image, the learning is difficult due to the fact that the learning is executed without clearly disaggregating the foreground and the background. Further, since a geometric relation between a plurality of views is precisely modeled, a problem may arise in that a restriction is imposed on a method of operating a camera used to photograph a moving image or the amount of calculation is large.

It is desirable to provide a technology of executing learning image processing with fewer suppositions and a smaller amount of calculation.

According to an embodiment of the present technology, there, is provided an image processing apparatus including: an image feature outputting unit that outputs each of image, features, which are formed as features of a plurality of feature points of images of each frame in data of an input moving, image, in correspondence with a time of the frame; a foreground estimating unit that estimates a foreground image at a time s by executing a view transform as a geometric transform on a foreground view model having the image feature of a foreground image in the image as a parameter in regard to the image feature at the time s, and then outputs an estimated foreground view; a background estimating unit that estimates a background image at the time s by executing a view transform as a geometric transform on a background view model having the image feature of a background image in the image as a parameter in regard to the image feature at the time s, and then outputs an estimated background view; a synthesized view generating unit that generates a synthesized view by synthesizing the estimated foreground view and the estimated background view; a foreground learning unit that learns the foreground view model based on an evaluation value obtained by comparison between the synthesized view and the image feature at the time s by updating the parameter of the foreground view model based on a stochastic generation model; and a background learning unit that learns the background view model based on the evaluation value by updating the parameter of the background view model based on a stochastic generation model.

The foreground estimating unit and the background estimating unit may each calculate a posterior probability of each of a plurality of the view transforms based on the evaluation value, estimate the view transform based on the image feature and the posterior probability, and output the estimated foreground view and the estimated background view, respectively, by executing the view transforms on the view model.

The foreground learning unit and the background, learning unit may each weight the parameter of the view model subjected to a plurality of the view transforms based on a posterior probability of each of the view transforms calculated based on the evaluation value, and update the parameter of the foreground view model and the parameter of the background view model, respectively, based on the weighted parameter.

The view model may be configured as a multi-view model formed by a plurality of view models corresponding to images obtained by viewing one of the foreground and the background at different angles.

One of the foreground view model and the background view model may be configured by a multi-view model formed by a plurality of view models corresponding to images obtained by viewing one of the foreground and the background at different angles.

The foreground estimating unit and the background estimating unit may each calculate a posterior probability of each of a plurality of the view models based on the evaluation value, estimate the view models based on the image feature and the posterior probability and output the estimated foreground view and the estimated background view by executing the view transform on the estimated view model corresponding to transition. One of HMM, FNN, RNN, a particle filter, and a Kalman filter may be used as a dynamics learning estimation model used for estimating a prior probability based on view transition in calculation of a posterior probability of the view model.

The foreground estimating unit and the background estimating unit may each calculate a posterior probability of each of a plurality of the view transforms based on the evaluation value, and estimate the view transform based on the image feature and the posterior probability.

The foreground learning unit and the background learning unit may each weight the parameter of the view model corresponding to a plurality of transitions based on a posterior probability of each of the transitions calculated based on the evaluation value, weight the parameter of the view model subjected to a plurality of the view transforms based on a posterior probability of each of the view transforms calculated based on the evaluation value, and update the parameter of the foreground view model, and the parameter of the background view model, respectively, based on the weighted parameter.

One of HMM, FNN, RNN, a particle filter, and a Kalman filter may be used as a dynamics learning estimation model used for estimating a prior probability based on view transform motion in calculation of a posterior probability of the view transform in the stochastic generation model.

The stochastic generation model used in the foreground learning unit may be different from the stochastic generation model used in the background learning unit.

The image feature outputting unit may output information in which a pixel position and a pixel value of each pixel correspond to each other as the image feature.

The image feature outputting unit may output a set of feature point positions detected by a Harris corner detection method as the image feature.

According to another embodiment of the present technology, there is provided an image processing method including: outputting, by an image feature outputting unit, each of image features, which are formed as features of a plurality of feature points of images of each frame in data of an input moving image, in correspondence with a time of the frame; estimating, by a foreground estimating unit, a foreground image at a time s by executing a view transform as a geometric transform on a foreground view model having the image feature of a foreground image in the image as a parameter in regard to the image, feature at the time s, and then outputting an estimated foreground view; estimating, by a background estimating unit, a background image at the time s by executing a view transform as a geometric transform on a background view model having the image feature of a background image in the image as a parameter in regard to the image feature at the time s, and then outputting an estimated background view; generating, by a synthesized view generating unit, a synthesized view by synthesizing the estimated foreground view and the estimated background view; learning, by a foreground learning unit, the foreground view model based on an evaluation value obtained by comparison between the synthesized view and the image feature at the time s by updating the parameter of the foreground view model based on a stochastic generation model; and learning, by a background learning unit, the background view model based on the evaluation value by updating the parameter of the background view model based on a stochastic, generation model.

According to still another embodiment of the present technology, there is provided a program causing a computer to function as an image processing apparatus including: an image feature outputting unit that outputs each of image features, which are formed as features of a plurality of feature points of images of each frame in data of an input moving image, in correspondence with a time of the frame; a foreground estimating unit that estimates a foreground image at a time s by executing a view transform as a geometric transform on a foreground view model having the image feature of a foreground image in the image as a parameter in regard to the image feature at the time s, and then outputs an estimated foreground view; a background estimating unit that estimates a background image at the time s by executing a view transform as a geometric transform on a background view model having the image feature of a background image in the image as a parameter in regard to the image feature at the time s, and then outputs an estimated background view; a synthesized view generating unit that generates a synthesized view by synthesizing the estimated foreground view and the estimated background view; a foreground learning unit that learns the foreground view model based on an evaluation value obtained by comparison between the synthesized view and the image feature at the time s by updating the parameter of the foreground view model based on a stochastic generation model; and a background learning unit that learns the background view model based on the evaluation value by updating the parameter of the background view model based on a stochastic generation model.

According to the embodiments of the present technology, each of image features, which are formed as features of a plurality of feature points of images of each frame in data of an input, moving image, is output in correspondence with a time of the frame; a foreground image at a time s is estimated by executing a view transform as a geometric transform on a foreground view model having the image feature of a foreground image in the image as a parameter in regard to the image feature at the time s, and then an estimated foreground view is output; a background image at the time s is estimated by executing a view transform as a geometric transform on a background view model having the image feature of a background image in the image as a parameter in regard to the image feature at the time s, and then an estimated background view is output; a synthesized view is generated by synthesizing the estimated foreground view and the estimated background view; the foreground view model is learned based on an evaluation value obtained by comparison between the synthesized view and the image feature at the time s by updating the parameter of the foreground view model based on a stochastic generation model; and the background view model is learned based on the evaluation value by updating the parameter of the foreground view model based on a stochastic generation model.

According to the embodiments of the present technology, it is possible to execute the learning image processing with fewer suppositions and a smaller amount of calculation.

DETAILED DESCRIPTION OF EMBODIMENTS

Hereinafter, embodiments of the present technology disclosed herein will be described with reference to the drawings.

First, a difference between learning image processing according to a technology of the related art and learning image processing according to the embodiment of the present technology will be described.

Figure 1:
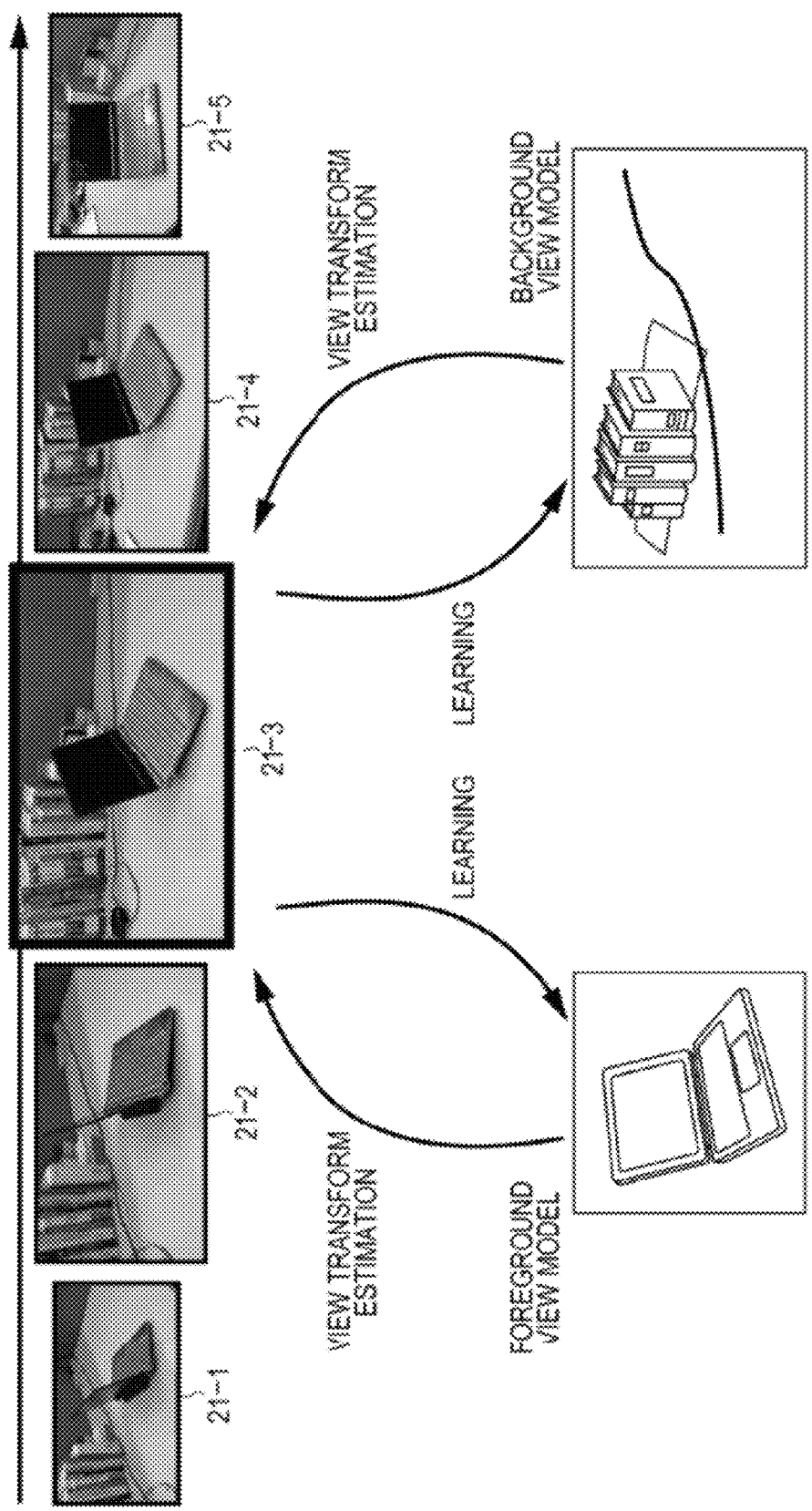
FIG. 1 is a diagram illustrating an example of a series of input images.

In the embodiment of the present technology, for example, as shown in FIG. 1, images 21-1 to 21-5 photographed chronologically as a moving image are provided as a series of input images and a foreground view model and a background view model are configured to be automatically froth the series of input images.

In the example shown in FIG. 1, a notebook-type personal computer is displayed in the images 21-1 to 21-5. For example, the images 21-1 to 21-5 are obtained by photographing the notebook-type personal computer from various angles while moving a camera at different positions around the notebook-type personal computer. For example, the images are obtained by facing the camera to the notebook-type personal computer and photographing a moving image while moving the camera from the left side to the right side.

In FIG. 1, the notebook-type personal computer is learned as a foreground. A desk on which the notebook-type personal computer is installed and books form a setting for the notebook-type personal computer are learned as a background. The foreground learning result is referred to as a foreground view model and the background learning, result is referred to as a background view model. Further, the view models will be described in detail later.

In the embodiment of the present technology, independency of a motion between the foreground and the background is supposed. That is, when the foreground to be learned makes a motion specified by MO1, it is supposed that the background to be learned makes a motion specified by MO2 other than MO1.

In the embodiment of the present technology, an optical anteroposterior relation is supposed. That is, it is supposed that a background to be learned may be hidden behind a foreground, but the foreground is not hidden behind the background.

In the embodiment of the present technology, as described above, the independency of the motion between a foreground and a background and the optical anteroposterior relation are set as restriction factors, and then the foreground view model is learned by executing view transform estimation on the foreground (the notebook-type personal computer) in, for example, the images 21-1 to 21-5. Further, the background view model is learned by executing the view transform estimation on the background (the desk, the books, and the like) in the images 21-1 to 21-5.

Figure 2:
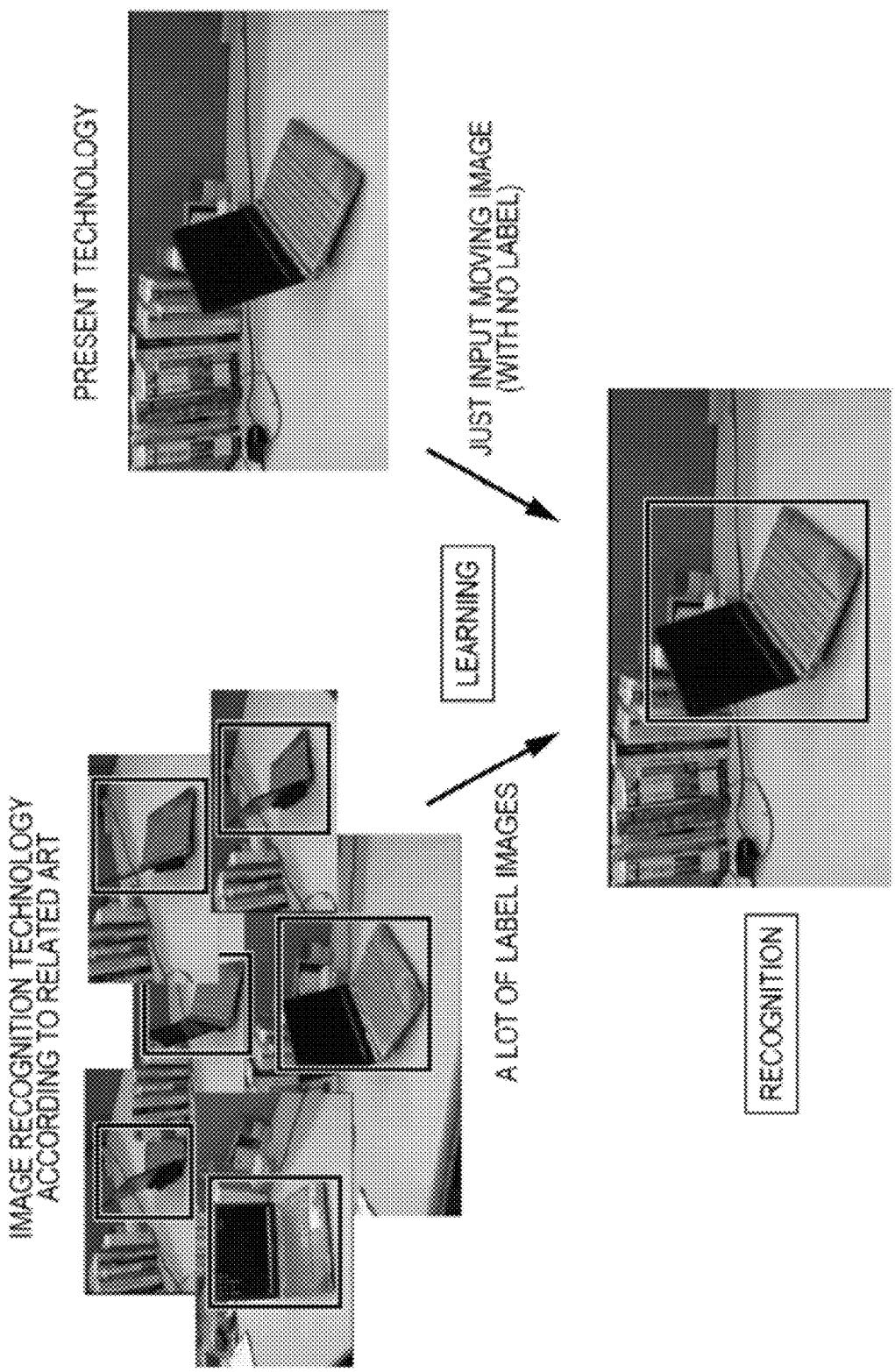
FIG. 2 is a diagram for describing image learning and recognition according to the related art and image learning and recognition according to the present technology.

Accordingly, in the technology according to the related art, as shown in FIG. 2, image recognition can be executed by just inputting a moving image without storing and learning an abundance of label images.

For example, in the image recognition according to the related art, granting a label to each of the images obtained by photographing notebook-type personal computer in a plurality of directions is learned. For example, the label includes information used for specifying the orientation of the notebook-type personal computer and a region where the notebook-type personal computer is displayed in the image. Thus, in the embodiment of the present technology, as shown in FIG. 2, the notebook-type personal computer can be recognized by just inputting a moving image with no label.

Next, a basic model used in the embodiment of the present technology will be described.

The embodiment of the present technology can correspond to both a single view model and a multi-view model, when a target image is recognized.

Here, the single view model means a model for which it is supposed that a foreground or a background to be learned can be expressed by one view model.

On the other hand, the multi-view model means a model for which it is supposed that a foreground or a background to be learned can be expressed by a plurality of view models. Further, the view model is considered to mean one image in the multi-view model.

For example, a series of input images is represented by I_1, I_2, I_3, ... I_S and image features of the series of input images are represented by X_1, X_2, X_3, ..., X_S. Further, since the series of input images may be set as, for example, image data of a moving image, I_1, I_2, I_3, ... I_S correspond to image data of frames of the moving image, respectively. Furthermore, the image feature of the series of input images can be set as a set of pixel values in images (the images of the respective frames) of the series of input images (moving image).

In the embodiment of the present technology, it is supposed that the image feature (which is also referred to as an observation feature) of the series of input images can be obtained by transforming the foreground view model or the background view model at each time. That is, the observation feature $X_s$ at a time s can be obtained through a view transform $T_s$ of a view model M at the time s by Equation (1).

$$X_s = T_s M \quad (1)$$

In Equation (1), M is a single view model. The view transform $T_s$ is a coordinate transform expressed by affine transform or the like.

On the other hand, when the multi-view model is used, a plurality of view models are present. For example, the multi-view model $M_v$ including L view models is expressed as $M_v = \{M_1, M_2, M_3, \ldots M_L\}$. For example the plurality of view models are considered to correspond to images obtained by viewing the foreground to be learned from the front side, the rear side, the side, and the like.

In this case, for example, it is supposed that the image feature (which is also referred to as an observation feature) can be obtained by executing the view transform of several view models at each time. That is, the observation feature $X_s$ at the time s can be obtained by the view transform $T_s$ of the view model $M_v$ at the time s by Equation (2).

$$X_s = T_s M_v \quad (2)$$

In the embodiment of the present technology, the view model shown in Equation (1) or Equation (2) is learned through a process described below.

Figure 3:
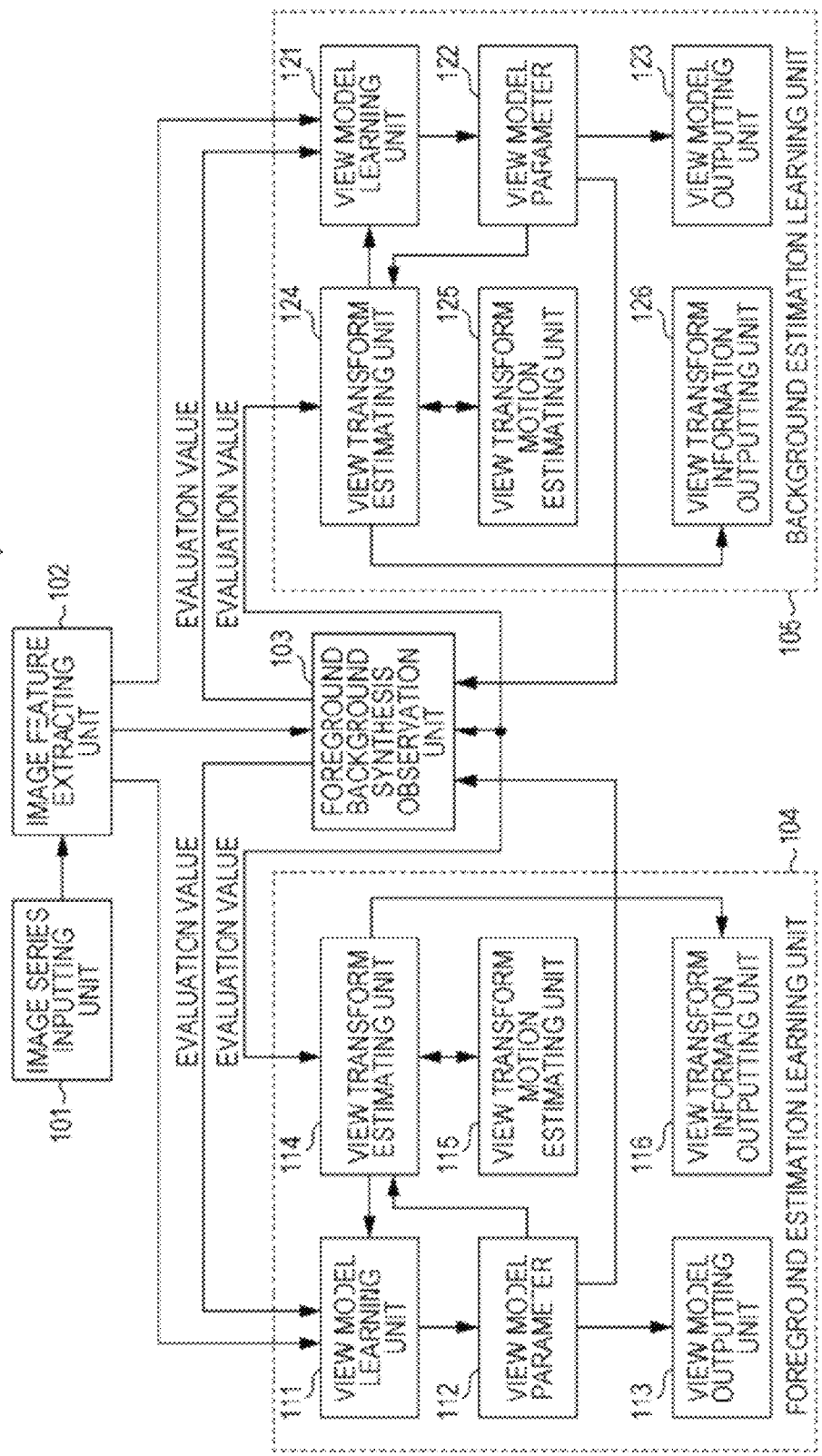
FIG. 3 is a block diagram illustrating an example of the configuration of a view model learning apparatus according to an embodiment of the present technology.

FIG. 3 is a block diagram illustrating an example of the configuration of a view model learning apparatus 100 according to an embodiment of the present technology. The view model learning apparatus 100 in FIG. 3 is assumed to use the single view model in foreground and background learning.

As shown in FIG. 3, the view model learning apparatus 100 includes an image series inputting unit 101, an image feature extracting unit 102, a foreground background synthesis observation unit 103, a foreground estimation learning unit 104, and a background estimation learning unit 105.

The foreground estimation learning unit 104 includes a view model learning unit 111, a view model parameter 112, view model outputting unit 113, a view transform estimating unit 114, a view transform motion estimating unit 115, and a view transform information outputting unit 116.

The background estimation learning unit 105 includes a view model learning unit 121, a view model parameter 122, a view model outputting unit 123, a view transform estimating unit 124, a view transform motion estimating unit 125, and a view transform information outputting unit 126.

The image series inputting unit 101 in FIG. 3 is a functional block that controls inputting the series of input images and supplies images allowed to correspond to respective times as the series of input images to image feature extracting unit 102, as described above.

The image feature extracting unit 102 extracts image features from the images at the respective times which is the series of input images. Specific examples of the image features include a luminance value of each pixel and a luminance histogram, a color histogram, and an edge histogram of each region formed by a plurality of pixels. Alternatively, the coordinates of each feature point detected through Harris corner detection and the local feature having a feature of a sterrable filter or the like may be used as the image feature.

In principle, the image feature includes a geometric element (geometric model) and a feature amount element (feature amount model), like a view model parameter of a view model described below. For example, the image feature may include a pixel position (geometric model) and a pixel value (feature amount model) of each pixel of images corresponding to one frame. Alternatively, the image feature may include a pixel position (geometric model) and pixel value (feature amount model) of a pixel at a predetermined feature point in images corresponding to one frame.

When a focal feature is used, as described below, the image feature may include only the pixel position (geometric model) of a pixel of a predetermined feature point in images corresponding to one frame.

The foreground background synthesis observation unit 103 synthesizes an estimated foreground view output (estimated) by the foreground estimation learning unit 104 and an estimated background view output (estimated) by the background estimation learning unit 105. The foreground background synthesis observation unit 103 compares the image feature of the synthesized image to the image feature supplied from the image feature extracting unit 102 and gives feedback information regarding an evaluation value of the estimation to the foreground estimation learning unit 104 and the background estimation learning unit 105, respectively.

That is, the foreground background synthesis observation unit 103 acquires the estimated foreground view from the foreground estimation learning unit 104. Here, when a view model parameter 112 stores a foreground view model $M_{FG}$ and a view transform of the foreground view model at the time s is $T_{FG,s}$, the estimated foreground view at the time s can be indicated by $T_{FG,s} M_{FG}$.

The foreground background synthesis observation unit 103 acquires the estimated background view from the background estimation learning unit 105. Here, when a view model parameter 122 stores a background view model $M_{BG}$ and a view transform of the background view model at the time s is $T_{BG,s}$, the estimated background view at the time s can be indicated by $T_{BG,s} M_{BG}$.

Then, the foreground background synthesis observation unit 103 forms a synthesized view model $M_{FGBG,s}$ of the foreground and the background.

The foreground background synthesis observation unit 103 determines a correspondent relation between a parameter of the image feature supplied from the image feature extracting unit 102 and a parameter of the synthesized view model. For example, the image feature $X_s$ at the time s has x1, x2, x3, ... xN as parameters and the synthesized view model $M_{FGBG,s}$ has m1, m2, m3, ..., mN as parameters.

For example, when the image feature is the luminance value (each pixel value) of each pixel, the image at the time s in the series of input images can be allowed to correspond to the pixel value of the coordinates corresponding to the synthesized view model at the time s.

For example, the correspondence relation is determined by allowing the pixel x1 at the coordinates (0, 0) of the image at the time s to correspond to a pixel m1 at the coordinates (0, 0) of the synthesized view model at the time s, allowing the pixel x2 at the coordinates (0, 1) of the image at the time s to correspond, to a pixel m2 at the coordinates (0, 1) of the synthesized view model at the time s, and the like. The correspondent relation between the image and the view model at the time s is indicated by $C_{XFGB,s}$.

The foreground background synthesis observation unit 103 calculates an evaluation value Es of the synthesized view model $M_{FCBG,s}$ for the image feature $X_s$ under the above-described correspondent relation $C_{XFGB,s}$. The evaluation value Es is the sum of absolute values (which are actually calculated by more complex calculation) of differences between the corresponding pixel values.

The foreground estimation learning unit 104 in FIG. 3 operates as follows.

For example, the view transform estimating unit 114 estimates the view transform $T_a$ suitable, for the image feature $X_s$ at the time s. That is the view transform estimating unit 114 executes view transform on the foreground view model and estimates the view transform by which a foreground image in the image feature $X_s$ can be obtained.

At this time, the view transform estimating unit 114 outputs (estimates) a plurality of candidates of the suitable view transform. For example, the view transform, estimating unit 114 outputs affine transform having hundred different parameters as the candidates of the view transform.

Here, for example, the view transform is executed by geometrically transforming the foreground view model. Specifically, transform for translating a view model, transform for expanding and reducing a view model, transform for rotating a view model, affine transform for executing a combination of the transforms, projection transform, or the like is used as a view transform. Since the candidates of the view transform are nearly indefinitely present, a candidate of the view transform to be output is specified based on the estimation result of the view transform motion estimating unit 115 described below.

The view transform motion estimating unit 115 is configured to estimate a view transform T's+1 at a time s+1 from the view transform $T_s$ at the time s. In general, when it is supposed that the foreground motion is regularly continuous, transform dynamics is supposed as a model which satisfies an equation of T's+1=$F_T$(Ts). For example, dynamics learning estimation model such as HMM (Hidden Markov Model), FNN (Feed Forward Neural Network), or RNN (Recurrent Neural Network) can be used as this model. A dynamic estimation model such as a particle filter or a Kalman filter can be used as this model.

More specifically, the view transform motion estimating unit 115 is configured to calculate a posterior probability of each view transform bated on the evaluation value Es output at a given time by the foreground background synthesis observation unit 103. The view transform estimating unit 114 is configured to estimate the view transform by selecting and outputting the suitable view transform at a given time based on the posterior probability of each view transform.

The view model parameter 112 stores the parameters of the foreground view model. Here, so to speak, the parameters of the foreground model is obtained by modeling the feature of an image for a foreground include parameters of the geometric model of a plurality of feature points and parameters of the feature amount model of each feature point.

The geometric model is a statistical model for relative positional relation between a plurality of feature points and the feature amount model is a statistical model for the feature of each feature point. For example, when the image feature is the luminance value (each pixel value) of each pixel, the geometric model means the coordinate value of each pixel. On the other hand, the feature amount model means an average value of values obtained by multiplying the pixel values of the respective coordinates obtained from a plurality of foregrounds by a weight. A method of using only an average and a method of using a normal-distribution (an average and a dispersion) can be used as the statistical models of the geometric model and the feature amount model.

The view model learning unit 111 learns the above-described geometric model and feature amount model for the image feature of the image at each time in the series of input images in regard to the feature points selected based on the correspondent relation determined by the foreground background synthesis observation unit 103. At this time, the view model learning unit 111 learns the geometric model through reverse transform of the view transform (for example, the affine transform) estimated by the view transform estimating unit 114. Then, the view model learning unit 111 statistically learns the feature amount model at all times based on the evaluation value output by the foreground background synthesis observation unit 103. In this way, the parameters of the view model are learned.

Calculation used to obtain the parameters of the view model including the parameters of the geometric, model and the parameters of the feature amount model and the learning, of these parameters will be described later.

The geometric model and the feature amount model learned by the view model learning unit 111 are stored in the view model parameter 112. Accordingly the actual numbers or the like of the foreground view model $M_{FG}$ are stored in the view model parameter 112.

The view transform information outputting unit 116 outputs the view transform at each time estimated by the view transform estimating unit 114 and the correspondent relation between the image and the view model at each time. For example, the output view transform and the output correspondent relation between the image and the view model can indicate the place where the learned foreground is located in the image, the size of the learned foreground, and the orientation of the learned foreground.

The view model outputting unit 113 outputs the view model of the foreground learned by the view model learning unit 111. Here, the output view model (the geometric model and the feature amount model) can be used when another input moving image is recognize. For example, the view model output from the view model outputting unit 113 can be used when the place where the learned foreground is located in a given image, the size of the learned foreground, and the orientation of the learned foreground are obtained.

Since a view model learning unit 121 to a view transform information outputting unit 126 of the background estimation learning unit 105 in FIG. 3 are the same functional blocks as the view model learning unit 111 to the view transform information outputting unit 116 of the foreground estimation learning unit 104, the detailed description will not be repeated. Of course, the background estimation learning unit 105 estimates the view transform of the background view model and learns the background view model.

Figure 4:
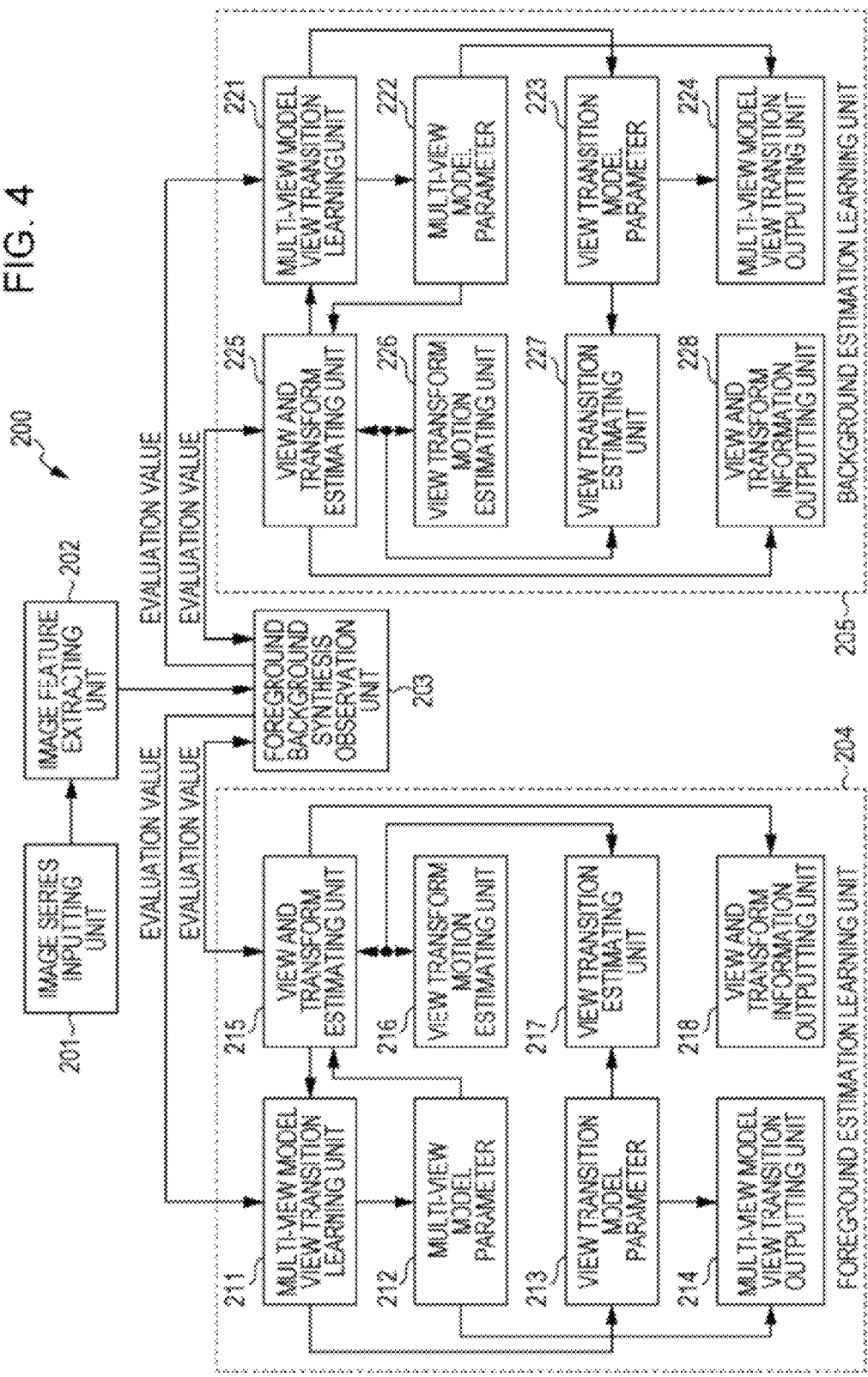
FIG. 4 is a block diagram illustrating an example of the configuration of a view model learning apparatus according to another embodiment of the present technology.

FIG. 4 is a block diagram illustrating an example of the configuration of a view model learning apparatus 200 according to another embodiment of the present technology. The view model learning apparatus 200 in FIG. 4 uses a multi-view model when learning a foreground and a background.

The view model learning apparatus 200 in FIG. 4 includes an image series inputting unit 201, an image feature extracting unit 202, a foreground background synthesis observation unit 203, a foreground estimation learning unit 204, and a background estimation learning unit 205.

The foreground estimation learning unit 204 includes a multi-view model view transition learning unit 211, a multi-view model parameter 212, a view transition model parameter 213, and a multi-view model view transition outputting unit 214. The foreground estimation learning unit 204 further includes a view and transform estimating unit 215, a view transform motion estimating unit 216, a view transition estimating unit 217, and a view and transform information outputting unit 218.

The background estimation learning unit 265 includes a multi-view model view transition learning unit 221, a multi-view model parameter 222, a view transition model parameter 223, and a multi-view model view transition outputting unit 224. The background estimation learning unit 205 further includes a view and transform estimating unit 225, a view transform motion estimating unit 226, a view transition estimating unit 227, and a view and transform information outputting unit 228.

The image series inputting unit 201 in FIG. 4 is a functional block that controls inputting the series of input images and supplies images allowed to correspond to respective times as the series of input images to image feature extracting unit 202, as described above.

The image feature extracting unit 202 extracts image features from the images at the respective times which is the series of input images. Specific examples of the image features include a luminance value of each pixel and a luminance histogram, a color histogram, and an edge histogram of each region formed by a plurality of pixels. Alternatively, the coordinates of each feature point detected through Harris corner detection and the local feature having a feature of a sterrable filter or the like may be used as the image feature.

In principle, the image feature includes geometric element (geometric model) and a feature amount element (feature amount model), like a view model parameter of a view model described below. For example, the image feature may include a pixel position (geometric model) and a pixel value (feature amount model) of each pixel of images corresponding to one frame. Alternatively, the image feature may include a pixel position (geometric model) and a pixel value (feature amount model) of a pixel at a predetermined feature point in images corresponding to one frame.

When a focal feature is used, as described below, the image feature may include only the pixel position (geometric model) of a pixel of a predetermined feature point in images corresponding to one frame.

The foreground background synthesis observation unit 203 synthesizes an estimated foreground view output (estimated) by the foreground estimation learning unit 204 and an estimated background view output (estimated) by the background estimation learning unit 205. The foreground background synthesis observation unit 203 compares the image feature of the synthesized image to the image feature supplied from the image feature extracting unit 202 and gives feedback information regarding an evaluation value of the estimation to the foreground estimation learning unit 204 and the background estimation learning unit 205, respectively.

That is, the foreground background synthesis observation unit 201 acquires the estimated foreground view from the foreground estimation learning unit 204. Further, since the view model learning apparatus 200 uses a multi-view model, the view model learning apparatus 200 acquires estimated foreground views by executing the view transform on a predetermined view model selected from a plurality of view models, unlike the view model learning apparatus 100.

The foreground background synthesis observation unit 203 acquires the estimated background view from the background estimation learning unit 205. Further, since the view model learning apparatus 200 uses a multi-view model, the view model learning apparatus 200 acquires estimated background views by executing the view transform on a predetermined view model selected from a plurality of view models, unlike the view model learning apparatus 100.

The foreground background synthesis observation unit 203 forms a synthesized view model of the foreground and the background, like the view model learning apparatus 100.

The foreground background synthesis observation unit 203 determines a correspondent relation between a parameter of the image feature supplied from the image feature extracting unit 202 and a parameter of the synthesized view model, like the view model learning apparatus 100.

The foreground background synthesis observation unit 203 calculates an evaluation value Es of the synthesized view model for the image feature $X_s$ under the above-described correspondent relation.

The foreground estimation learning unit 204 in FIG. 4 operates as follows.

Like the view transform estimating unit in FIG. 3, for example, the view and transform estimating unit 215 estimates the view transform $T_s$ suitable for the image feature $X_s$ at the time s. Unlike the view transform estimating unit 114, the view and transform estimating unit 215 estimates the suitable view model based on the estimation of the view transition estimating unit 217 described below.

For example, the view and transform estimating unit 215 outputs plurality of candidates of combination of the suitable view models and the view transforms. For example, the view and transform estimating unit 215 outputs the candidates such as combination of a view model VM1 and a view transform T1, combination of a view model VM2 and a view transform T2, and the like.

Like the view transform motion estimating unit 115 in FIG. 3, the view transform motion estimating unit 216 is configured to estimate a view transform T's+1 at the time s+1 from the view transform $T_s$ at the time s.

More specifically, the view transform motion estimating unit 216 is configured to calculate a posterior probability of each view transform based or the evaluation value Es output at a given time by the foreground background synthesis observation unit 203. The view and transform estimating unit 215 is configured to estimate the view transform by selecting and outputting the suitable view transform at the subsequent time based on the posterior probability of each view transform.

The multi-view model parameter 212 has, for example, L view models and are configured by a multi-view model $M_V = \{M_1, M_2, M_3, \ldots M_L\}$. For example, $M_1, M_2, M_3, \ldots M_L$ are considered to correspond to images obtained by viewing the foreground to be learned from the front side, the rear side, the side, and the like.

In the case of the multi-view model, $M_1, M_2, M_3, \ldots M_L$ each have a geometric model and a feature amount model. Each of $M_1, M_2, M_3, \ldots M_L$ is referred to as a view model.

The view transition estimating unit 217 estimates a view model $M'_{v,s+1}$ at the time s+1 from a view model $M_{v,s}$ at the time s. Here, since it is supposed that a foreground to be learned has a three-dimensional structure, a model satisfying, for example, an equation of $M'_{v,s+1} = F(M_{v,s})$ can be supposed. For example, a dynamics learning estimation model such as HMM can be used as this model.

More specifically, the view transition estimating unit 217 is configured to calculate a posterior probability of the view model corresponding to each view transition based on the evaluation value Es output at a given time by the foreground background synthesis observation unit 203. The view and transform estimating unit 215 is configured to estimate the view model (view transition) by selecting and outputting the suitable view model at the subsequent time based on the posterior probability of each view model.

The multi-view model view transition learning unit 211 learns a foreground multi-view model, like the view model learning unit 111. That is, the multi-view model view transition learning unit 211 learns the above-described geometric model and feature amount model for the image feature of the image at each time in the series of input images in regard to the feature points selected based on the correspondent relation determined by the foreground background synthesis observation unit 203. In this case, for example, the geometric model and the feature amount model are learned in correspondence with each of the plurality of view models $M_1, M_2, M_3, \ldots M_L$.

The multi-view model view transition learning unit 211 learns a view transition model, as necessary, unlike the view model learning unit 111.

Here, the view transition model is considered as a dynamics model. Specifically, parameters of a predetermined dynamics model such as HMM is learned, as necessary. Further, the parameters of the dynamics model may be given in advance.

The dynamics model will be described in detail later. Further, calculation used to obtain the parameters of the view model including the parameters of the geometric model and the parameters of the feature amount model and the learning of these parameters will be described later.

The view transition model parameter 213 stores the above-described parameters of the dynamics model. For example, each value of a state transition probability of HMM is stored as a parameter. Accordingly, the actual numbers or the like of the foreground view transition model are stored in the view transition model parameter 213.

At this time, the parameters stored in the view transition model parameter 213 are stored in correspondence with the foreground to be learned. For example, when a notebook-type personal computer is learned as a foreground, an index or the like specifying the notebook-type personal computer is granted and each value the like of the state transition probability of HMM is stored as a parameter. Further, for example, when a doll is learned as a foreground, an index or the like specifying the doll is granted and each value or the like of the state transition probability of the HMM is stored as a parameter.

In this way, it is possible to efficiently learn, for example, a dynamics model of the view transition in accordance with the motion of an object to be learned.

The view and transform information outputting unit 218 outputs the view model and the view transform at each time estimated by the view and transform estimating unit 215 and the correspondent relation between the image and the view model at each time. For example, the output view transform and the output correspondent relation between the image and the view model can indicate the place where the learned foreground is located in the image, the size of the learned foreground, and the orientation of the learned foreground.

The multi-view model view transition outputting unit 214 outputs the foreground multi-view model learned by the multi-view model view transition learning unit 211. Here, the output multi-view model and the view transition model can be used when another input moving image is recognized. For example, the view model output from the view model outputting unit 113 an be used when the place where the learned foreground is located in a given image, the size of the learned foreground, and the orientation of the learned foreground are obtained.

Since a multi-view model view transition learning unit 221 to a view and transform information outputting unit 228 of the background estimation learning unit 205 in FIG. 4 are the same functional blocks as the multi-view model transition learning unit 221 to the view and transform information outputting unit 228 of the foreground estimation learning unit 204, the detailed description will not be repeated. Of course, the background estimation learning unit 205 estimates the view transition and the view transform of a background multi-view model and learns the multi-view model and the background view transition model.

Next, the learning of the view model parameter in the view model learning unit 111 in FIG. 3 will be described.

In the embodiment of the present technology, the view model parameters are calculated using an EM algorithm. That is, the view model parameters are calculated and learned by substituting Equation (1) described above by a model equation of a stochastic generation model and applying the EM algorithm. Further, the EM algorithm is disclosed in detail in, for example, "Unsupervised Learning of Multiple Objects in Images" by Michalis K. Titsias, Doctor Thesis, in University of Edinburgh, 2005.

First, the parameters of the view model M are given as m1, m2, m3, . . . , mN. In effect, the parameters of the view model M include the parameters (for example, the coordinate value or the like of each feature point) mG1, mG2, mG3, . . . , mGN of the geometric model and the parameters (for example, the pixel value or the like of each feature point) mF1, mF2, mF3, . . . , mFN of the feature amount model. Hereinafter, the parameters of the view model M are expressed as M={m1, m2, m3, . . . , mN}, the parameters of the geometric model are expressed, as $M_G$={mG1, mG2, mG3, . . . , mGN}, and the parameters of the feature amount model are expressed as $M_F$={mF1, mF2, mF3, . . . , mFN}.

The image feature $X_s$ of the series of input images at the time s are assumed to include x1, x2, x3, . . . , xN as parameters. In effect, the parameters of the image feature $X_s$ includes the parameters (for example, the coordinate values of the respective feature points) xG1, xG2, xG3, . . . , xGN of the geometric model and the parameters (for example, the pixel values of the respective feature points) xF1, xF2, xF3, . . . , xFN of the feature amount model. Hereinafter, the parameters of the image feature $X_s$ are expressed as $X_s$={x1, x2, x3, . . . , xN}, the parameters of the geometric model are expressed as $X_{G,s}$={xG1, xG2, xG3, . . . , xGN}, and the parameters of the feature amount model are expressed as $X_{F,s}$={xF1, xF2, xF3, . . . , xFN}.

Further, T1, T2, . . . , T100 are present as the candidates of the view transform output at the time s. Hereinafter, the candidates of the view transform are expressed as T={T1, T2, . . . , T100}. It is assumed that NT kinds of view transform are present.

On the supposition described above, the model equation of the stochastic generation model corresponding to Equation (1) can be expressed as Equation (3).

$$P(X_s|M, T_{s,k}) = \sum_{k=1}^{100} P_{T_k} \cdot C_{s,k} T_k M \qquad (3)$$

In this equation, $P_{Tk}$ indicates a prior probability of the view transform Tk and Tk indicates a k-th candidate of the view transform output at the time s. Further, $C_{s,k}$ indicates the correspondent relation between the parameters of the image feature and the parameters of the view model parameters when the view transform Tk is executed at the time s.

As described above, the parameters of the view model include the parameters of the geometric model and the parameters of the feature amount model. Accordingly, from Equation (3), the model equation of the stochastic generation model for the geometric model can be expressed as Equation (4) and the model equation of the stochastic generation model for the feature amount model can be expressed as Equation (5).

$$P(X_{G,s}|M_G, T_{s,k}) = \sum_{k=1}^{100} P_{T_k} \cdot C_{s,k} T_k M_G \quad (4)$$

$$P(X_{F,s}|M_F, T_{s,k}) = \sum_{k=1}^{100} P_{T_k} \cdot C_{s,k} M_F \quad (5)$$

The learning of the view model expressed as the above-described stochastic generation model can be formulated as a problem of maximum likelihood estimation of maximizing a logarithmic likelihood LH of P(X|M) for the image features $X_1, X_2, \ldots, X_s$ at all times with respect to the view model parameters. This problem may be solved using the EM algorithm. Further, the logarithmic likelihood LH of P(X|M) is expressed by Equation (6). Here, it is assumed that Nx is the number (the number of times s) of image features extracted.

$$LH = \sum_{1}^{N_X} \log P(X_s|M) \quad (6)$$

The E step of the EM algorithm corresponds to a step of calculating the posterior probability of the view transform T={T1, T2, ..., T100) for the image features $X_1, X_2, \ldots, X_s$ at each time, when the view model M={m1, m2, m3, ..., mN} is given. That is, when the image feature $X_s$ is extracted (observed), the posterior probability can be calculated as a probability $P(Tk|X_s)$ at which the view transform is Tk by Equation (7).

$$P(T_k|X_s) = \frac{P_{T_k} \cdot P(X_s|T_k)}{\sum_{1}^{N_X} P_{T_k} \cdot P(X_s|T_k)} \quad (7)$$

In Equation (7), $P(X_s|Tk)$ is a likelihood and is calculated by the foreground background synthesis observation unit 103 in FIG. 3. The likelihood $P(X_s|Tk)$ is used as the above-described evaluation value Es. In Equation (7), $P_{Tk}$ is a prior probability at which the view transform Tk is output and is calculated by the view transform motion estimating unit 115 in FIG. 3. Then, the view transform estimating unit 114 finally calculates Equation (7).

On the other hand, in the M step, of the EM algorithm, the view model parameters are calculated, when the posterior probability $P(Tk|X_s)$ of each view transform at each time is given. M={m1, m2, m3, ..., mN} can be calculated by Equation (8).

$$M = \frac{1}{S} \sum_{s=1}^{S} \sum_{k=1}^{N_T} P(T_k|X_s) \cdot T_k^{-1} C_{s,k} X_s \quad (8)$$

Equation (8) is calculated by the view model learning unit 111 in FIG. 3. The view model parameters already stored in the view model parameter 112 are gradually updated based on the parameter {m1, m2, m3, ..., mN} calculated by Equation (8). In this way, the view model parameters are learned. Further, in Equation (8), it is supposed that a total of NT view transforms are present.

That is, the posterior probability of each of the NT view transforms is calculated every time by the view transform estimating unit 114 and is stored in the view transform motion estimating unit 115. The view transform estimating unit 114 estimates the view transform based on the posterior probability output from the view transform motion estimating unit 115 to generate a estimated foreground view, so that the synthesized view model is formed.

The view model parameters of the synthesized view model are compared to the image features extracted from the actually input images and the evaluation value is calculated by the foreground background synthesis observation unit 103. Based on the calculated evaluation value, the view transform estimating unit 114 calculates the posterior probability of each view transform and the view model learning unit 111 updates the view model, parameters by the posterior probability in a weighted manner.

The learning of the view model parameters in the view model learning unit 111 in FIG. 3 has hitherto been described. However, the view model parameters in the view model learning unit 121 in FIG. 3 executes the learning in this way.

Next, the learning of the view model parameter in the multi-view view transition learning unit 211 in FIG. 4 will be described.

First, the multi-view model $M_v$ is assumed to include {$M_1$, $M_2$, $M_3$, ..., $M_L$}. Here, the view model $M_1$ includes view model parameters {m11, m12, m13, ..., m1N} and the view model $M_2$ includes view model parameters {m21, m22, m23, ..., m2N}. In this way, each view model includes view model parameters. As described above, in effect, the view model parameter includes the parameter of the geometric model and the parameter of the feature amount model.

Further, the image feature $X_s$ of the series of input images at the time s is assumed to include x1, x2, x3, ..., xN as parameters. In effect, the parameters of the image feature $X_s$ include the parameters (for example, the coordinate values of the feature points) xG1, xG2, xG3, ..., xGN of the geometric model and the parameters (for example, the pixel values of the feature points), xF1, xF2, xF3, ..., xFN of the feature amount model. Hereinafter, the parameters of the image feature $X_s$ are expressed as $X_s$={x1, x2, x3, ..., xN}, the parameters of the geometric model are expressed as $X_{G,s}$={xG1, xG2, xG3, ..., xGN}, and the parameters of the feature amount model are expressed as $X_{F,s}$={xF1, xF2, xF3, ..., xFN}.

Further, T1, T2, ..., T100 are present as the candidates of the view transform output at the time s. Hereinafter, the candidates of the view transform are expressed as T={T1, T2, ..., T100}. It is assumed that NT kinds of view transform are present.

On the supposition described above, the model equation of the stochastic generation model corresponding to Equation (2) can be expressed as Equation (9). Equation (9) expresses the view model $M_v$ and the evaluation value of the view transform Tk with respect to the image feature amount $X_s$.

Equation (9) is calculated by the foreground background synthesis observation unit 203 in FIG. 4 and is supplied as the evaluation value Es to the view and transform estimating unit 215 and the multi-view model view transition learning unit 211.

$$P(X_s|M_v, T_k) = \sum_{v=1}^{L} P_{M_v} \sum_{k=1}^{100} P_{T_k} \cdot C_{s,k} T_k M_v \qquad (9)$$

In this equation, $P_{MV}$ indicates a prior probability of the view model $M_v$ in the multi-view model, $P_{Tk}$ indicates prior probability of the view transform Tk, and Tk indicates a k-th candidate of the view transform output at the time s. Further, $C_{a,k}$ indicates the correspondent relation between the parameters of the image feature and the parameters of the view model parameters when the view transform Tk is executed at the time s.

As in the case of the single view described above, the model equation of the stochastic generation model for the geometric model and the model equation of the stochastic generation model for the feature amount model can be expressed, but will not be repeated here.

The learning of the view model expressed as the above-described stochastic generation model can be formulated as a problem of maximum likelihood estimation of maximizing the logarithmic likelihood LH of P(X|M) for the image features $X_1, X_2, \ldots, X_s$ at all times with respect to the view model parameters. This problem may be solved using the EM algorithm. Further, the logarithmic likelihood LH of P(X|M) is expressed by Equation (10).

$$LH = \sum_{1}^{N_X} \sum_{1}^{L} \log P(X_s|M_v) \qquad (10)$$

The E step of the EM algorithm corresponds to a step of calculating the posterior probabilities of the multi-view model $M_v\{M_1, M_2, M_3, \ldots, M_L\}$ and the view transform $T=(T_1, T_2, \ldots, T_{100})$ for the image features $X_1, X_2, \ldots, X_s$ at each time, when the view model $M_1=\{m11, m12, m13, \ldots, m1N\}$, the view model $M_2=\{m21, m22, m23, \ldots, m2N\}$, and the like of the multi-view model $M_v=\{M_1, M_2, M_3, \ldots, M_L\}$. That is, when the image feature $X_s$ is extracted (observed), the posterior probability can be calculated as a probability at which the view transform is $M_v$ by Equation (11). Further, when the image feature $X_s$ is extracted (observed), the posterior probability can be calculated as a probability $P(Tk|X_s)$ at which the view transform is Tk by Equation (12).

$$P(M_v|X_s) = \frac{P_{M_v} \cdot P(X_s|M_v)}{\sum_{1}^{L} P_{M_v} \cdot P(X_s|M_v)} \qquad (11)$$

$$P(T_k|X_s) = \frac{P_{T_k} \cdot P(X_s|T_k)}{\sum_{1}^{L} P_{T_k} \cdot P(X_s|T_k)} \qquad (12)$$

In Equation (11), $P(X_s|Tv)$ is a likelihood associated with the view transform and is calculated by the view and transform estimating unit 215 based on the evaluation value by Equation (9) calculated by the foreground background synthesis observation unit 203 in FIG. 4. That is, in the evaluation value calculated by Equation (9), the likelihood associated with each view model $M_v$ can be obtained by extracting one view model $M_v$ and calculating the total sum of the evaluation values of the respective view models. In Equation (11), $P_{Mv}$ is a probability at which the view-model $M_v$ is estimated and is calculated by the view transition estimating unit 217 in FIG. 4. Then, the view and transform estimating unit 215 finally calculates Equation (11).

In Equation (12), $P(X_s|Tk)$ is a likelihood associated with the view transform and is calculated by the view and transform estimating unit 215 based on the evaluation value by Equation (9) calculated by the foreground background synthesis observation unit 203 in FIG. 4. That is, in the evaluation value calculated by Equation (9), the likelihood associated with each view model in the view transform Tk can be obtained by extracting one view transform Tk and calculating the total sum of the evaluation values of the respective view models. In Equation (12), $P_{Tk}$ is a probability at which the view transform Tk is estimated and is calculated by the view transform motion estimating unit 216 in FIG. 4. Then, the view and transform estimating unit 215 finally calculates Equation (12).

On the other hand, in the M step of the EM algorithm, the view model parameters are calculated, when the posterior probability $P(M_v|X_s)$ of each view transform at each time and the posterior probability $P(Tk|X_s)$ of each view transform a each time are given. $M_v=\{mv1, mv2, mv3, \ldots, mvN\}$ can be calculated by Equation (13).

$$M_v = \frac{1}{S} \sum_{s=1}^{S} P(M_v|X_s) \sum_{k=1}^{N_T} P(T_k|X_s) \cdot T_k^{-1} C_{s,k} X_s \qquad (13)$$

Equation (13) is calculated by the multi-view model view transition learning unit 211 in FIG. 4. The view model parameters of the respective models already stored in the multi-view model parameter 212 are gradually updated based on the view model parameter $\{mv1, mv2, mv3, \ldots, mvN\}$ calculated by Equation (13). Further, in Equation (13), it is supposed that a total of NT view transforms are present.

That is, the posterior probability of each of the NT view transforms is calculated every time by the view and transform estimating unit 215 and is stored in the view transform motion estimating unit 216. The view and transform estimating unit 215 calculates the posterior probability of each of the L view models (the result of the view transition) every time and stores the posterior probability of each of the L view models in the view transition estimating unit 217. Further, the view and transform estimating unit 215 estimates the view transform based on the posterior probability output from the view transform motion estimating unit 216 and estimates the view transition based on the posterior probability output from the view transition estimating unit 217 to generate a estimated foreground view, so that the synthesized view model is formed.

The view model parameters of the synthesized view model are compared to the image features extracted from the actually input images and the evaluation value is calculated by the foreground background synthesis observation unit 203. Based on the calculated evaluation value, the view and transform estimating unit 215 calculates the posterior probability of each view transform and calculates the posterior probability of each view model. Further, the multi-view model view transition learning unit 211 updates the view model parameters by the posterior probability in a weighted manner.

The view model parameters of one view model among the L view models of the multi-view model are calculated through the calculation of Equation (13). Accordingly, the calculation of Equation (13) is calculated by the number of view models of the multi-view model.

In this way, the view model parameters are learned.

As described above, the multi-view model view transition learning unit 211 learns the view transition model. For example, the parameters of the view transition model are calculated and learned based on the $P(M_v|X_s)$ in Equation (11).

The learning of the multi-view model view transition learning unit 211 in FIG. 4 has hitherto been described. However, the multi-view model view transition learning unit 221 in FIG. 4 executes the learning in this way.

Figure 5:
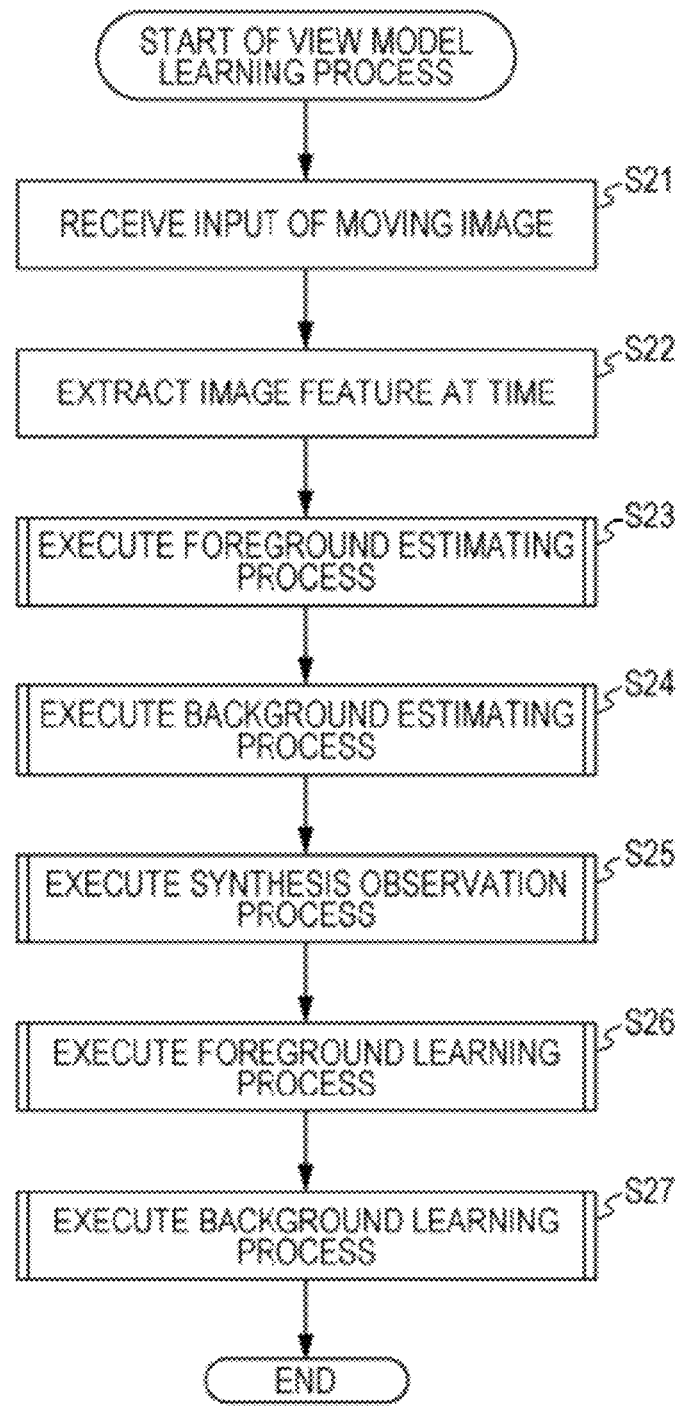
FIG. 5 is a flowchart illustrating an example of a view model learning process.

Next, an example of a multi-view learning process executed by the view model learning apparatus 100 in FIG. 3 will be described with reference to the flowchart of FIG. 5.

In step S21, the image series inputting unit 101 receives an input of a moving image. Then, images of a frame allowed to be correspond respective times are supplied as a series of input image to the image feature extracting unit 102.

In step S22, the image feature extracting unit 102 extracts the image feature from the image at each time in the series of input images input in the process of step S21.

In step S23, the foreground estimation learning unit 104 executes a foreground estimating process described below with reference to the flowchart of FIG. 6. Then, the foreground estimation learning unit 104 outputs the estimated foreground view obtained by executing a plurality of view transforms on the foreground view model.

In step S24, the background estimation learning unit 105 executes a background estimating process described with reference to the flowchart of FIG. 7. Then, the background estimation learning unit 105 outputs the estimated background view obtained by executing a plurality of view transforms on the background view model.

In step S25, the foreground background synthesis observation unit 103 executes a synthesis observation process described with reference to the flowchart of FIG. 8. Then, the foreground background synthesis observation unit 103 synthesizes the estimated foreground view output in the process of step S23 and the estimated background view output in the process of step S24 to generate a synthesized view model and calculates the evaluation value of the synthesized view model for the image feature extracted in the process of step S22.

In effect, the processes of step S23 to step S25 are executed repeatedly by the length of the moving image, and then the view model learning process proceeds to step S26.

Figure 9:
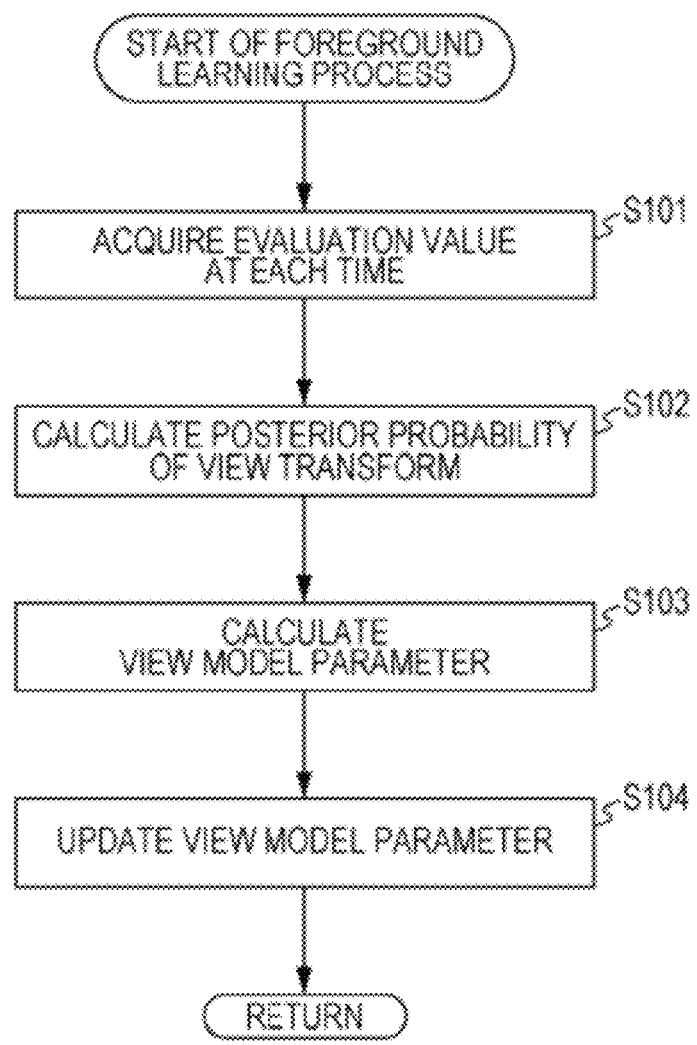
FIG. 9 is a flowchart illustrating an example of a foreground learning process.

In step S26, the foreground estimation learning unit 104 executes a foreground learning process described with reference to the flowchart of FIG. 9. Then, the view model parameters of the foreground are updated based on the evaluation value obtained in the process of step S25.

Figure 10:
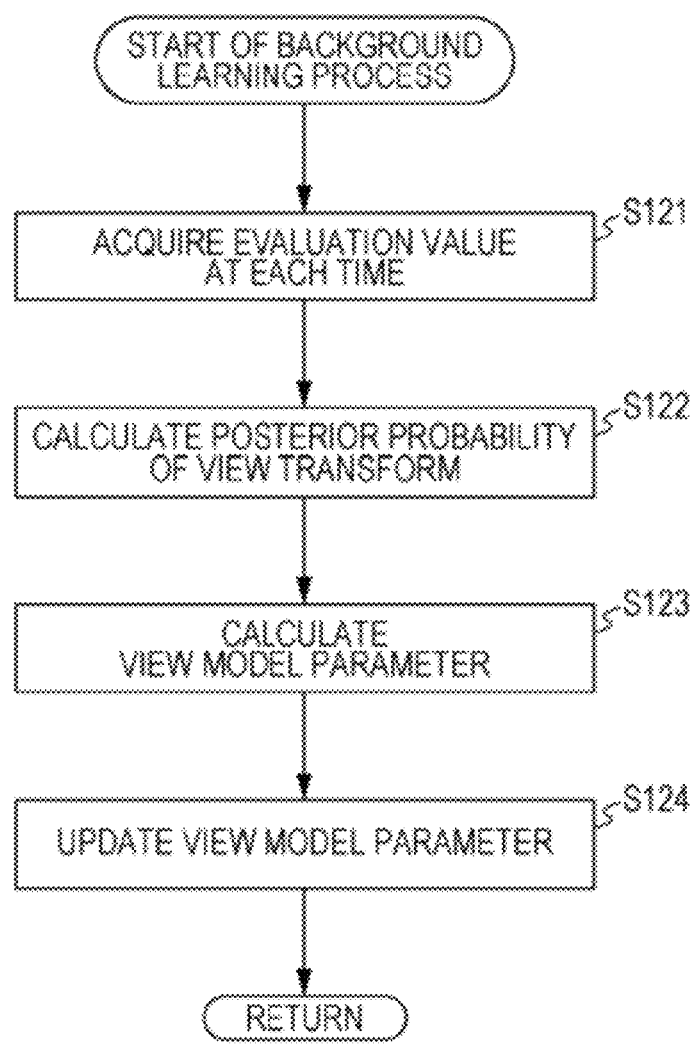
FIG. 10 is a flowchart illustrating an example of a background learning process.

In step S27, the background estimation learning unit 105 executes a background learning process described with reference to the flowchart of FIG. 10. Then, the view model parameters of the background are updated based on the evaluation value obtained in the process of step S25.

In effect, for example, the processes of step S23 to step S27 are executed repeatedly a predetermined number or times or until a variation amount of the logarithmic likelihood expressed in Equation (6) is equal to or less than a predetermined threshold value.

In this way, the view model learning process is executed.

Next, a detailed example of the foreground estimating process of step S23 in FIG. 5 will be described with reference to FIG. 6.

In step S41, the view transform motion estimating unit 115 estimates the view transform T's at the time s from the view transform $T_{s-1}$ at a time s−1. In general, since it is supposed that the motion of the foreground is regular or continuous, the motion of the foreground is estimated for the dynamics of the transform by using the dynamic estimation model such as a particle filter.

In step S42, the view transform estimating unit 114 estimates the suitable view transform $T_s$ at the time s based on the estimation result of the view transform motion estimating unit 115 in step S41. At this time, the view transform estimating unit 114 outputs a plurality of candidates of the suitable view transform Ts. For example, the view transform estimating unit 114 outputs the affine transform having hundred different parameters as the candidate of the view transform. Specifically, the view transform estimating unit 114 outputs transform for translating a foreground view model, transform for expanding and reducing a foreground view model, transform for rotating a foreground view model, affine transform for executing a combination of the transforms, or projection transform.

In step S43, the view transform estimating unit 114 executes a plurality of view transforms estimated in the process of step S42 on the foreground view model. At this time, the parameters of the foreground view model are read from the view model parameter 112 and are subjected to the view transforms.

In step S44, the view transform estimating unit 114 outputs the estimated foreground view obtained as the result of the process of step S43. Here, the plurality of estimated foreground views corresponding to the candidates of the view transform are output.

In this way, the foreground estimation process is executed.

Next, a detailed example of the background estimating process of step S24 in FIG. 5 will be described with reference to FIG. 7.

In step S61, the view transform motion estimating unit 125 estimates the view transform T's at the time s from the view transform $T_{s-1}$ at the time s−1. In general, since it is supposed that the motion of the background is regularly continuous, the motion of the background is estimated for the dynamics of the transform by using the dynamic estimation model such as a particle filter.

In step S62, the view transform estimating unit 124 estimates the suitable view transform $T_s$ at the time s based on the estimation result of the view transform motion estimating unit 125 in step S61. At this time, the view transform estimating unit 124 outputs a plurality of candidates of the suitable view transform. For example, the view transform estimating unit 124 outputs the affine transform having hundred different parameters as the candidate of the view transform. Specifically, for example the view transform estimating unit 124 outputs affine transform for translating the image of a foreground, affine transform for expanding and reducing the image of a foreground, affine transform for rotating the image of a foreground, and affine transform of a pattern such as affine transform for projecting the image of a foreground.

In step S63, the view transform estimating unit 124 executes a plurality of view transforms estimated in the process of step S62 on the background view model. At this time, the parameters of the background view model are read from the view model parameter 122 and are subjected to the view transforms.

In step S64, the view transform estimating unit 124 outputs the estimated background view obtained as the result of the process of step S63. Here, the plurality of estimated background views corresponding to the candidates of the view transform are output.

Alternatively, in the case of the background estimating process, only one candidate of the view transform may be output in step S62 and one estimated background view may be output in step S64. This because that the motion of a background is sufficiently small in comparison to the foreground, for example, when an object as the foreground is moving.

In this way, the background estimation process is executed.

Next, a detailed example of the synthesis observation process executed in step S25 in FIG. 5 will be described with reference to the flowchart of FIG. 8.

In step S81, the foreground background synthesis observation unit 103 forms the synthesized view model of the foreground and the background.

Figure 6:
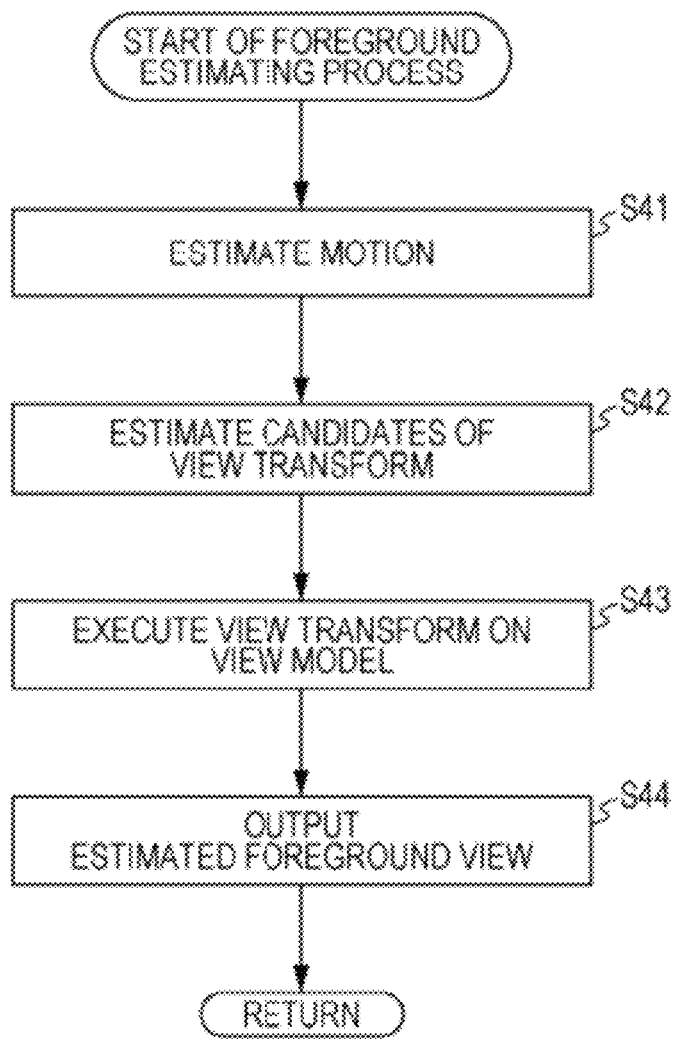
FIG. 6 is a flowchart illustrating an example of a foreground estimating process.
Figure 7:
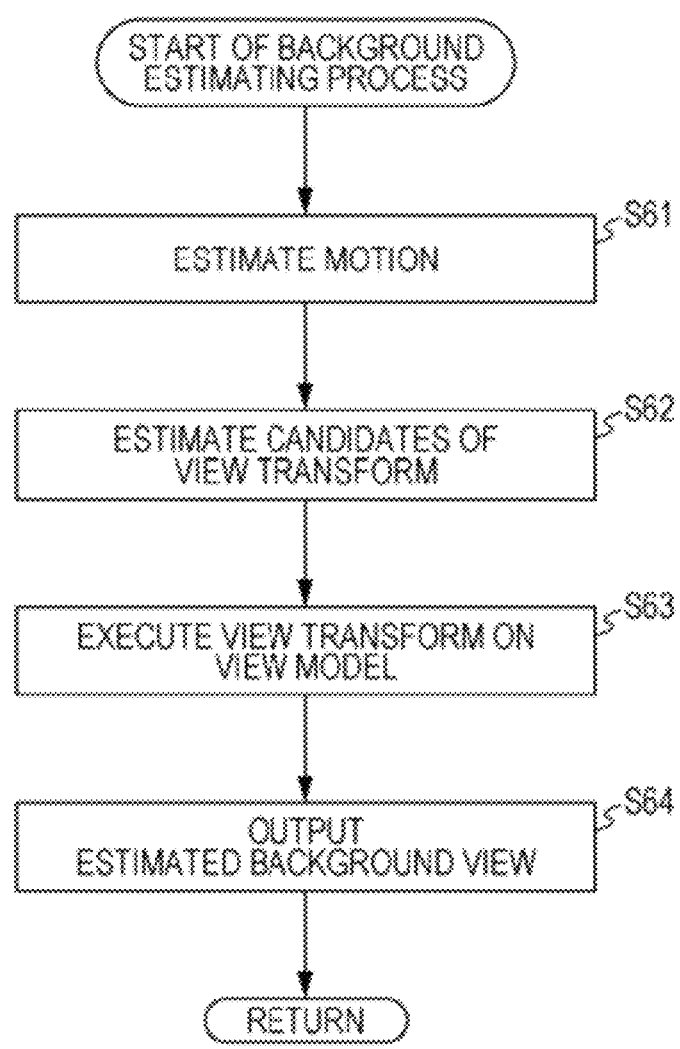
FIG. 7 is a flowchart illustrating an example of a background estimating process.

At this time, the foreground, background synthesis observation unit 103 synthesizes the estimated foreground view output in the process of step S44 in FIG. 6 and the estimated background view output in the process of step S64 in FIG. 7. Further, the foreground background synthesis observation unit 103 determines the correspondent relation between the parameters of the image feature extracted in the process of step S22 in FIG. 5 and the parameters of the synthesized view model.

In step S82, the foreground background synthesis observation unit 103 calculates the evaluation value of the synthesized view model formed in the process of step S81 with respect to the image feature extracted in the process of step S22.

In this way, the synthesis, observation process is executed.

Next, a detailed example of the foreground learning process of step S26 in FIG. 5 will be described with reference to the flowchart of FIG. 9.

Figure 8:
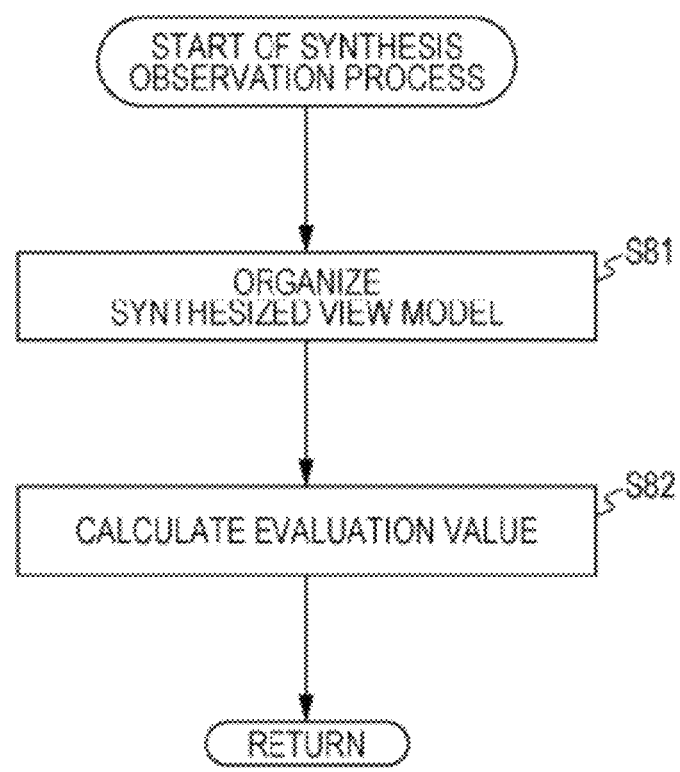
FIG. 8 is a flowchart illustrating an example of a synthesis observation process.

In step S101, the view transform estimating unit 114 and the view model learning unit 111 each acquire the evaluation value which is the evaluation value calculated in the process of step S82 in FIG. 8 and is the evaluation value of the synthesized view model at each time. In this case, the likelihood $P(X_s|Tk)$ is acquired as the evaluation value in correspondence with each time.

In step S102, the view transform estimating unit 114 calculates the posterior probability of each view transform. At this time, when the image feature $X_s$ is extracted (observed), the posterior probability is calculated as the probability $P(Tk|X_s)$, at which the view transform is Tk, by Equation (7) described above.

In Equation (7), $P_{Tk}$ is a probability output by the view transform Tk. The probability $P_{Tk}$ is calculated in correspondence with each view transform by the view transform motion estimating unit 115 and is supplied to the view transform estimating unit 114.

In step S103, the view model learning unit 111 calculates the view model parameters. That is, the view model learning unit 111 calculates the view model parameters using Equation (8) described above when the posterior probability. $P(Tk|X_s)$ of each view transform at each time obtained in the process of step S102 is given.

In step S104, the view model learning unit 111 updates the view model parameter 112 based on the view model parameters obtained in the process of step S103.

In this way, the foreground learning process is executed.

Next, a detailed example of the background learning process of step S27 in FIG. 5 will be described with reference to the flowchart of FIG. 10.

In step S121, the view transform estimating unit 124 and the view model learning unit 121 each acquire the evaluation value which is the evaluation value calculated in the process of step S82 in FIG. 8 and is the evaluation value of the synthesized view model at each time. In this case, the likelihood $P(X_s|Tk)$ is acquired as the evaluation value in correspondence with each time.

In step S122, the view transform estimating unit 124 calculates the posterior probability of each view transform. At this time, when the image feature $X_s$ is extracted (observed), the posterior probability is calculated as the probability $P(Tk|X_s)$, at which the view transform is Tk, by Equation (7) described above.

In Equation (7), $P_{Tk}$ is a probability output by the view transform Tk. The probability $P_{Tk}$ is calculated in correspondence with each view transform by the view transform motion estimating, unit 125 and is supplied to the view transform estimating unit 124.

In step S123, the view model learning unit 121 calculates the view model parameters. That is, the view model learning unit 121 calculates the view model parameters using Equation (8) described above, when the posterior probability $P(Tk|X_s)$ of each view transform at each time obtained in the process of step S122 is given.

In step S124, the view model learning unit 121 updates the view model parameter 122 based on the view model parameters obtained in the process of step S123.

In this way, the background learning process is executed.

Figure 11:
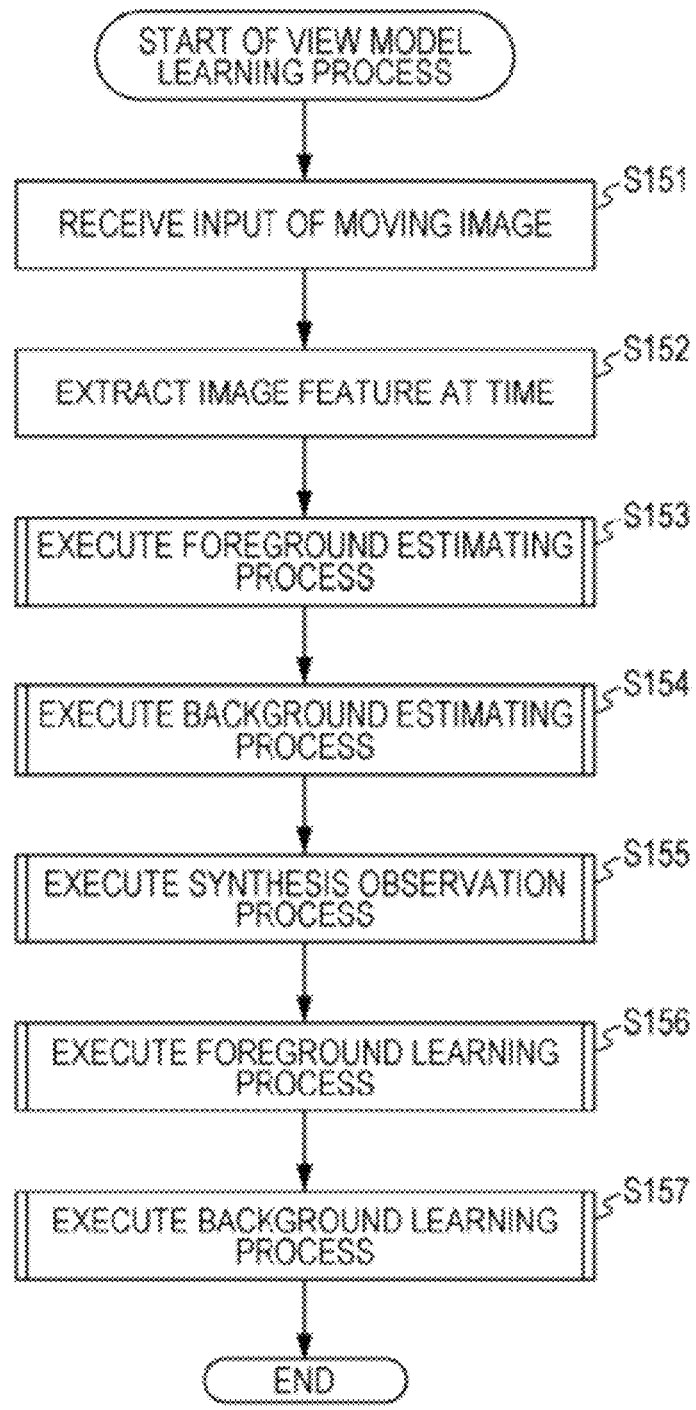
FIG. 11 is a flowchart illustrating another example of the view model learning process.

Next, an example of the view model learning process executed by the view model learning apparatus 200 in FIG. 4 will be described with reference to the flowchart of FIG. 11.

In step S151, the image series inputting unit 201 receives an input of a moving image. Then, an image allowed to correspond to each time is supplied as a series of input image to the image feature extracting unit 202.

In step S152, the image feature extracting unit 202 extracts the image feature from the image at each time in the series of input images input the process of step S151.

In step S153, the foreground estimation learning unit 204 executes a foreground estimating process described below with reference to the flowchart of FIG. 12. Then, the foreground estimation learning unit 204 outputs the plurality of candidates of a combination of the suitable view models among the view models of the foreground multi-view model and the suitable view transforms among the plurality of view transforms. For example, the foreground estimation learning unit 204 outputs the candidates of the combination of the view model VM1 and the view transform T1, the candidates of the combination f the view model VM2 and the view transform T2, and the like. Each estimated foreground view obtained by such a combination is output.

In step S154, the background estimation learning unit 205 executes the background estimating process described with reference to the flowchart of FIG. 13. Then, the background estimation learning unit 205 outputs the plurality of candidates of a combination of the suitable view model among the view models of the background multi-view model and the suitable view transform the plurality of view transforms. Each estimated background view obtained by such a combination is output.

In step S155, the foreground background synthesis observation unit 203 executes the synthesis observation process described with reference to the flowchart of FIG. 14. Then, the foreground background synthesis observation unit 203 synthesizes the estimated foreground view output in the process of step S153 and the estimated background view output in the process of step S154 to generate a synthesized view model and calculates the evaluation value of the synthesized view model for the image feature extracted in the process of step S152.

In effect, the processes of step S153 to step S155 are executed repeatedly by the length of the moving image, and then the multi-view model learning process proceeds to step S156.

Figure 15:
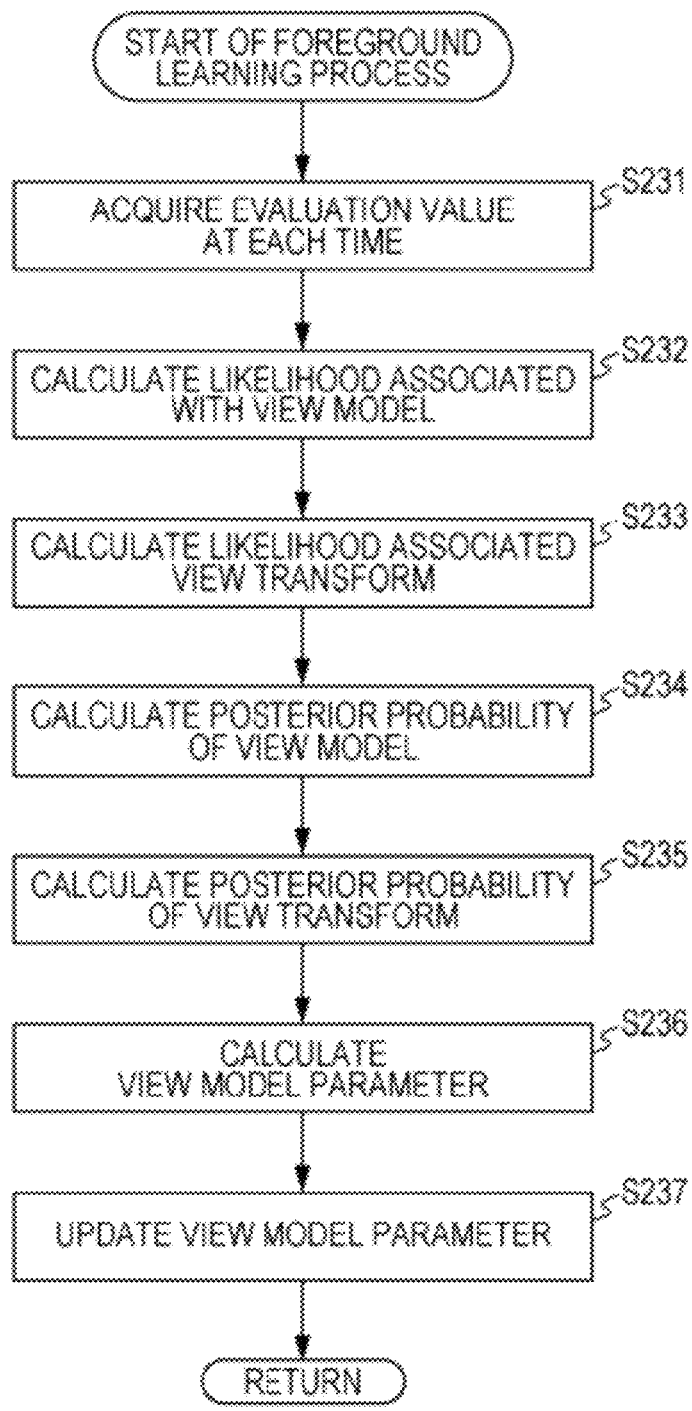
FIG. 15 is a flowchart illustrating another example of the foreground learning process.

In step S156, the foreground estimation learning unit 204 executes a foreground learning process described with reference to the flowchart of FIG. 15. Then, the view model parameters of the foreground are updated based on the evaluation value obtained in the process of step S155.

Figure 16:
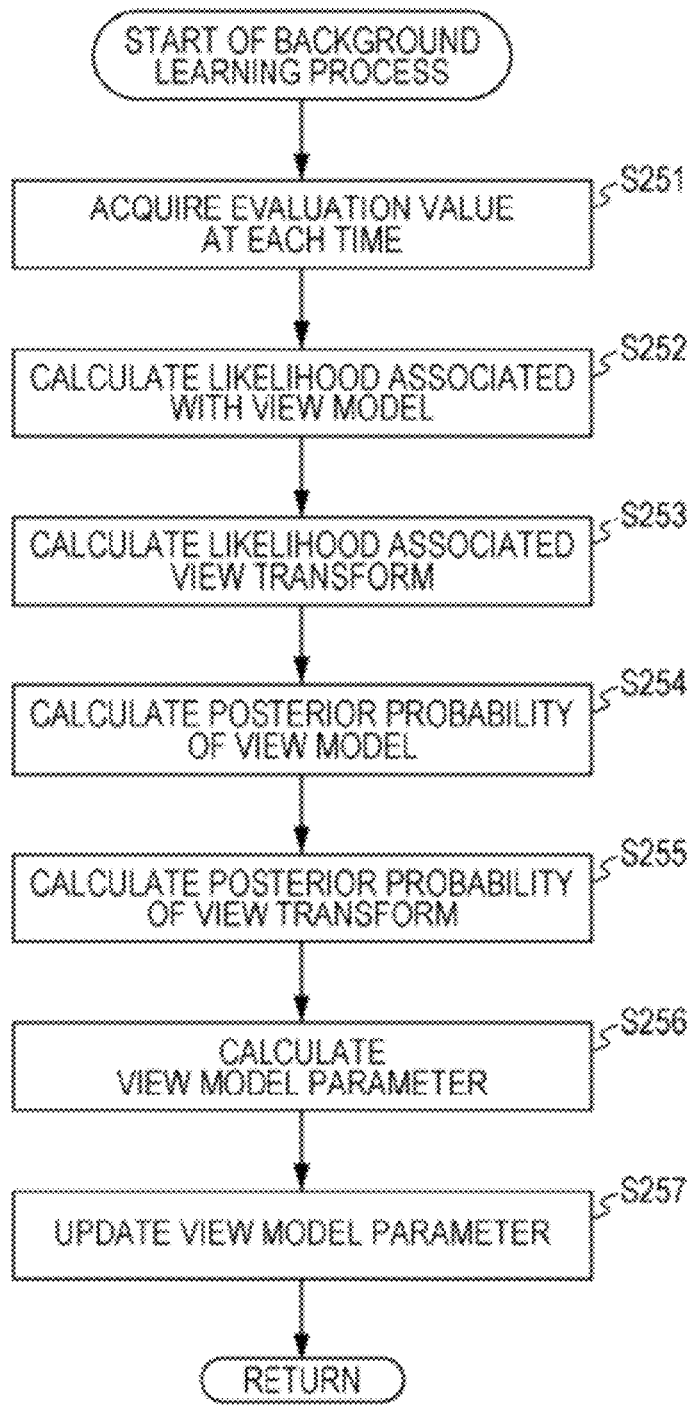
FIG. 16 is a flowchart illustrating another example of the background learning process.

In step S157, the background estimation learning unit 205 executes a background learning process described with reference to the flowchart of FIG. 16. Then, the view model parameters of the background are updated based on the evaluation value obtained in the process of step S155.

In effect, for example, the processes of step S23 to step S27 are executed repeatedly a predetermined number or times or until a variation amount of the logarithmic likelihood expressed in Equation (10) is equal to or less than a predetermined-threshold value.

In this way, the view model learning process executed.

Next, a detailed example of the foreground estimating process of step S153 in FIG. 11 will be described with reference to FIG. 12.

In step S171, the view transition estimating unit 217 estimates the view model $M'_{v,s}$ at the time s from the view model $M_{v,s-1}$ at the time s−1. Here, since it is supposed that a three-dimensional structure is present in the foreground to be learned, for example, the transition of the view model is estimated using a stochastic generation model such as HMM.

In step S172, the view and transform estimating unit 215 estimates the candidates of the view model based on the estimation result of the view transition estimating unit 217 in step S171. At this time, the view and transform estimating unit 215 outputs the plurality of candidates of the suitable view model.

In step S173, the view transform motion estimating unit 216 estimates the view transform at the time s from the view transform $T_{s-1}$ at the time s−1. In general, since it is supposed that the motion of the foreground is regularly continuous, the motion of the foreground is estimated for the dynamics of the transform by using the dynamic estimation model such a particle filter.

In step S174, the view and transform estimating unit 215 estimates the suitable view transform $T_s$ at the time s based on the estimation result of the view transform motion, estimating unit 216 in step S172. At this time, the view and transform estimating unit 215 outputs a plurality of candidates of the suitable view transform. For example, the view and transform estimating unit 215 outputs the affine transform having a plurality of patterns as the candidate of the affine transform. Specifically, for example, the view and transform estimating unit 215 outputs affine transform for translating the image of a foreground, affine transform for expanding and reducing the image of a foreground, affine transform for rotating the image of a foreground, and affine transform of a pattern such as affine transform for projecting the image of a foreground.

In step S175, the view and transform estimating unit 215 executes the view transform output in the process of step S174 on each view model output in the process of step S172. At this time, the parameters of each estimated view model are read from the multi-view model parameter 212 and are subjected to the view transform.

At this time, a predetermined number of combinations of the view models and the view transforms is selected and subjected to the view transform. For example, hundred combinations of the view model's and the view transforms, that is, the combination of the view model VM1 and the view transform T1, the combination of the view model VM2 and the view transform T2, and the like are selected and each combination is subjected to the view transform.

In step S176, the view and transform estimating unit 215 outputs the estimated foreground view obtained as the result of the process of step S175. Here, the view and transform estimating unit 215 outputs the plurality of estimated foreground views corresponding to the combinations of the view models and the view transforms.

In this way, the foreground estimating process is executed.

Next, a detailed example of the background estimating process of step S154 in FIG. 11 will be described with reference to FIG. 13.

In step S191, the view transition estimating unit 227 estimates the view model $M'_{v,s}$ at the time s from the view model $M_{v,s-1}$ at the time s−1. Here, since it is supposed that a three-dimensional structure is present in the background to be learned, for example, the transition of the view, model is estimated using a stochastic generation model such as HMM.

In step S192, the view and transform estimating unit 225 estimates the candidates of the view model based on the estimation result of the view-transition estimating unit 227 in step S191. At this time, the view and transform estimating unit 225 outputs the plurality of candidates of the suitable view model.

In step S193, the view transform, motion estimating unit 226 estimates the view transform T's at the time s from the view transform $T_{s-1}$ at the time s−1. In general, since it is supposed that the motion of the background is regular or continuous, the motion of the background is estimated for the dynamics of the transform by using the dynamic estimation model such as a particle filter.

In step S194, the view and transform estimating unit 225 estimates the suitable view transform $T_s$ at the time s based on the estimation result of the view transform motion estimating unit 226 in step S192. At this time, the view and transform estimating unit 225 outputs a plurality of candidates of the suitable view transform. For example, the view and transform estimating unit 225 outputs the affine transform having hundred different patterns as the candidate of the affine transform. Specifically, the view transform estimating unit 225 outputs transform for translating a background view model, transform for expanding and reducing a background view model, transform for rotating background view model, affine transform for executing a combination of the transforms, or projection transform.

In step S195, the view and transform estimating unit 225 executes the view transform output in the process of step S194 on each view model output in the process of step S192. At this time, the parameters of each estimated view model are read from the multi-view model parameter 222 and are subjected to the view transform.

At this time, a predetermined number of combinations of the view models and the view transforms is selected and subjected to the view transform. For example, hundred combinations of the view models and the view transforms are selected and each combination is subjected to the view transform.

In step S196, the view and transform, estimating unit 225 outputs the estimated background view obtained as the result of the process of step S195. Here, the view and transform estimating unit 215 outputs the plurality of estimated, background views corresponding to the combinations of the view models and the view transforms.

Alternatively, in the case of the background estimating process, only one candidate of the view model may be output in step S192, only one candidate of the view transform may be output in step S194, and one estimated background view may be output in step S196. This because that the motion of a background is sufficiently small in comparison to the foreground, for example, when an object as the foreground is moving.

In this way, the background estimation process is executed.

Next, a detailed example of the synthesis observation process executed in step S155 in FIG. 11 will be described with reference to the flowchart of FIG. 14.

In step S211, the foreground background synthesis observation unit 203 forms the synthesized view model of the foreground and the background.

Figure 12:
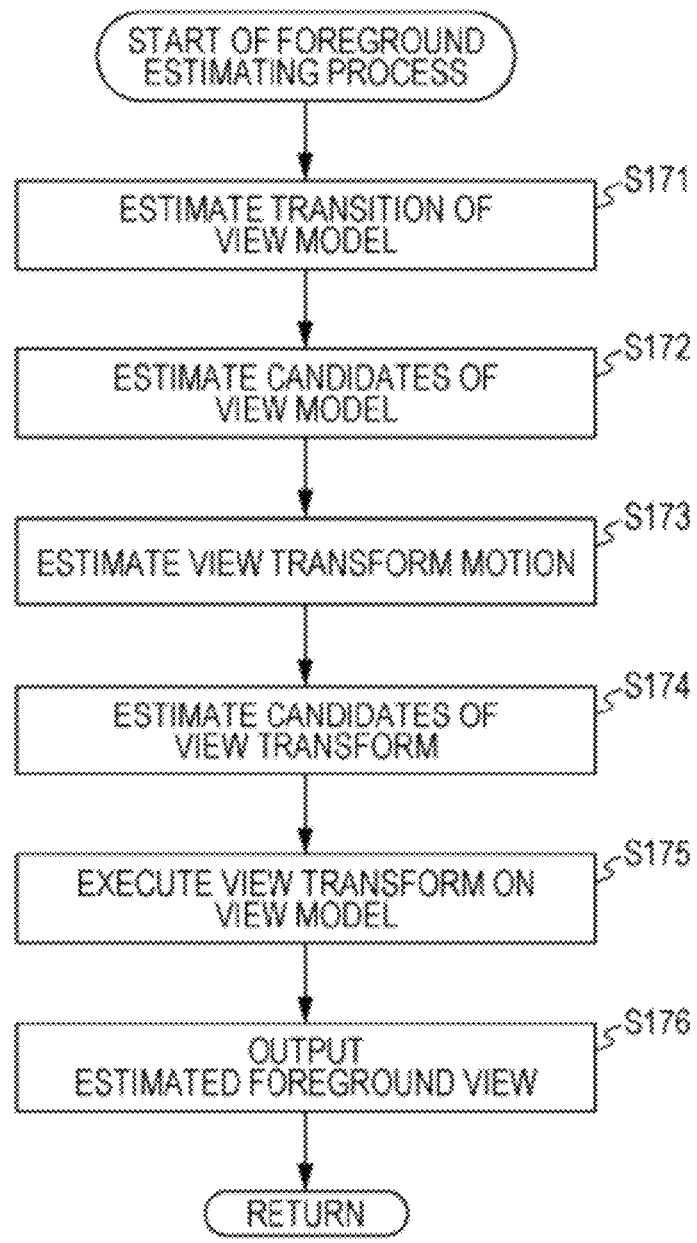
FIG. 12 is a flowchart illustrating another example of the foreground estimating process.
Figure 13:
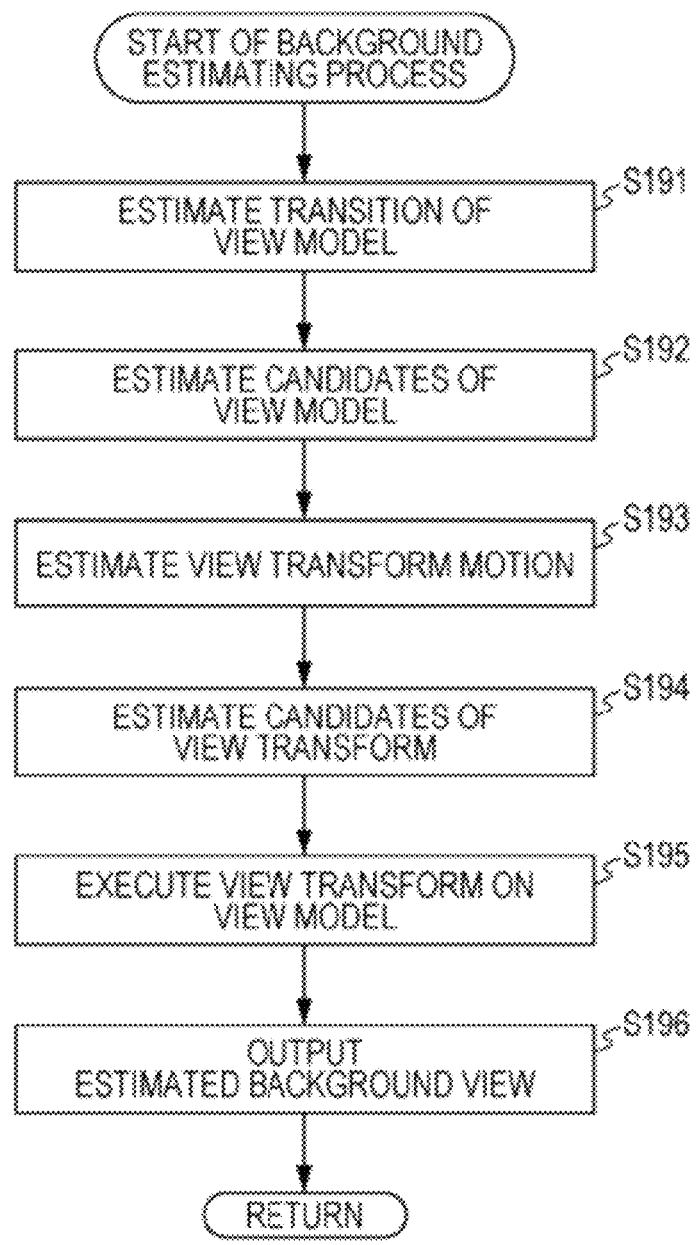
FIG. 13 is a flowchart illustrating another example of the background estimating process.

At this time, the foreground background synthesis observation unit 203 synthesizes the estimated foreground view output in the process of step S176 in FIG. 12 and the estimated background view output in the process of step S196 in FIG. 13. Further, the foreground background synthesis observation unit 203 determines the correspondent relation between the parameters of the image feature extracted in the process of step S152 in FIG. 5 and the parameters of the synthesized view model.

In step S212, the foreground background synthesis observation unit 203 calculates the evaluation value of the synthesized view model formed in the process of step S211 with respect to the image feature extracted in the process of step S152. At this time, the foreground background synthesis observation unit 203 calculates the evaluation value using Equation (9) described above.

In this way, the synthesis observation process is executed.

Next, a detailed example of the foreground learning process of step S156 in FIG. 15 will be described with reference to the flowchart of FIG. 11.

Figure 14:
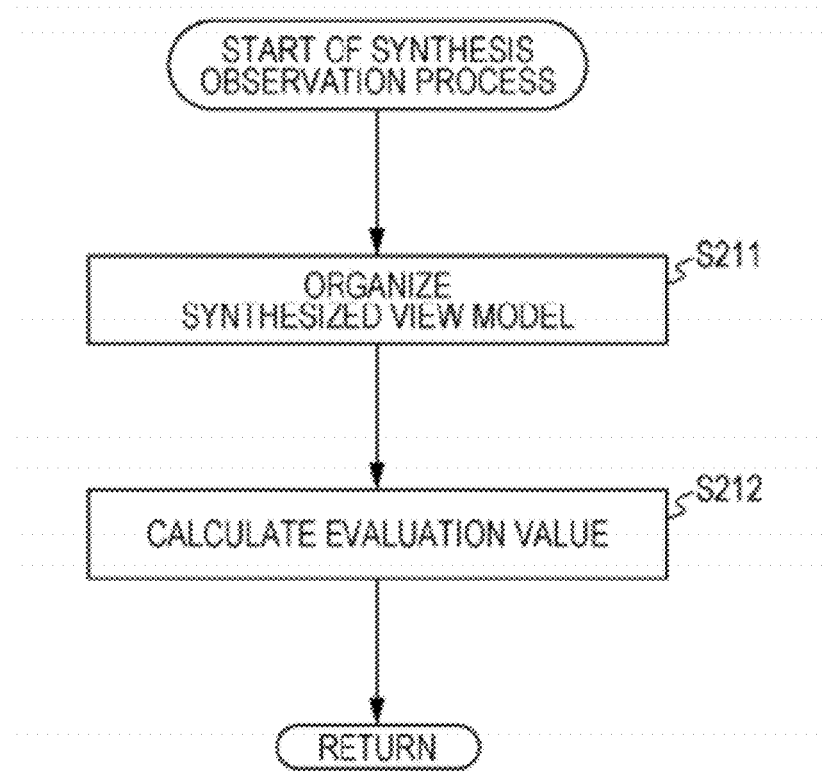
FIG. 14 is a flowchart illustrating another example of the synthesis observation process.

In step S231, the view and transform estimating unit 215 and the multi-view model view transition learning unit 211 each acquire the evaluation value which is the evaluation value calculated in the process of step S212 in FIG. 14 and is the evaluation value of the synthesized view model at each time.

In step S232, the view and transform estimating unit 215 calculates a likelihood associated with the view model based on the evaluation value acquired in step S231. In this case, the likelihood $P(X_s|M_v)$ is calculated in correspondence with each time.

In step S233, the view and transform estimating unit 215 calculates a likelihood associated with the view transform based on the evaluation value acquired in step S231. In this case, the likelihood $P(X_s|Tk)$ is calculated in correspondence with each time.

In step S234, the view, end transform estimating unit 215 calculates the posterior probability of each view model. At this time, when the image feature $X_s$ is extracted (observed), the posterior probability is calculated as the probability $P(M_v|X_s)$, at which the view model is $M_v$, by Equation (11) described above.

In Step S235, the view and transform estimating unit 215 calculates the posterior probability of each view transform. At this time, when the image feature $X_s$ is extracted (observed), the posterior probability is calculated as the probability $P(Tk|X_s)$, at which the view transform is Tk, by Equation (12) described above.

In Equation (11), $P_{Mv}$ is a probability output by the view model $M_v$. The probability $P_{Mv}$ is calculated in correspondence with each view transform by the view transition estimating unit 217 and is supplied to the view and transform estimating unit 215. In Equation (12), $P_{Tk}$ is a probability output by the view transform Tk. The probability $P_{Tk}$ is calculated in correspondence with each view transform by the view transform motion estimating unit 216 and is supplied to the view and transform estimating unit 215.

In step S236, the multi-view model view transition learning unit 211 calculates the view model parameters. That is, the multi-view model view transition learning unit 211 calculates the view model parameters using Equation (13) described above, when the posterior probability $P(M_v|X_n)$ of each view model at each time obtained in the process of step S234 and the posterior probability $P(Tk|X_s)$ of each view transform at each time obtained in the process of step S235 are given.

In step S237, the multi-view model view transition learning unit 211 updates the multi-view model parameter 212 based on the view model parameters obtained in the process of step S236.

In this way, the foreground learning process is executed.

Next, a detailed example of the background learning process of step S157 in FIG. 11 will be described with reference to the flowchart of FIG. 16.

In step S251, the view and transform estimating unit 225 and the multi-view model view transition learning unit 221 each acquire the evaluation value which is the evaluation value calculated in the process of step S212 in FIG. 14 and is the evaluation value of the synthesized view model at each time.

In step S252, the view and transform estimating unit 225 calculates the likelihood associated with the view model based on the evaluation value acquired in step S251. At this time, the likelihood $P(X_s|Tk)$ is calculated in correspondence with each time.

In step S253, the view and transform estimating unit 225 calculates the likelihood associated with the view transform based on the evaluation value acquired in step S251. At this time, the likelihood $P(X_s|Tk)$ is calculated in correspondence with each time.

In step S254, the view and transform estimating unit 225 calculates the posterior probability of each view model. At this time, when the image feature $X_s$ is extracted (observed), the posterior probability is calculated as the probability $P(M_v|X_s)$, at which the view model is $M_v$, by Equation (11) described above.

In step S255, the view and transform estimating unit 225 calculates the posterior probability of each view model. At this time, when the image feature $X_s$ is extracted (observed), the posterior probability is calculated as the probability $P(Tk|X_s)$, at which the view transform is Tk, by Equation (12) described above.

In Equation (11), $P_{Mv}$ is a prior probability output by the view model $M_v$. The prior probability $P_{Mv}$ is calculated in correspondence with each view model by the view transition estimating unit 227 and is supplied to the view and transform estimating unit 225. In Equation (12), $P_{Tk}$ is a probability output by the view transform Tk. The probability $P_{Tk}$ is calculated in correspondence with each view transform by the view transition motion estimating unit 226 and is supplied to the view and transform estimating unit 225.

In step S256, the multi-view model view transition learning unit 221 calculates the view model parameters. That is, the multi-view model view transition learning unit 221 calculates the view model parameters using Equation (13) described above, when the posterior probability $P(M_v|X_s)$ of each view model at each time obtained in the process of step S254 and the posterior probability $P(Tk|X_s)$ of each view transform obtained in the process of step S255 are given.

In step S257, the multi-view model view transition learning unit 221 updates the multi-view model parameter 222 based on the view model parameters obtained in the process of step S256.

In this way, the background learning process is executed.

For example, in a learning image process according to the related art, learning is executed by granting a label of a recognition target to an abundance of image data as learning data, when a model of the recognition target is learned to form a recognizer.

For example, when an image is learned for face recognition, it is necessary to grant, as a label, information or the like used for specifying the name of a person, the orientation of his or her face, and a region where the facial image of the person is displayed. Further when an image is learned for object recognition, it is necessary to grant, as a label, information or the like used for specifying the name of an object, the orientation of the object, and a region where the object is displayed.

For example, the granting of the label increases a processing burden when an image is learned in the learning image processing. Therefore, it is difficult to complete the learning in a short time.

In the embodiment of the present technology, however, it is not necessary to learn an image by granting the label of the recognition target to the abundance of image data. Accordingly, the learning can easily be completed, for example, by simply inputting a moving image or the like.

Further, in the embodiment of the present technology, the modeling is realized so that the view transition estimation of the individual view models of the multi-view model is executed statistically using HMM or the like. Thus, for example, it is not necessary to complete the learning for each view. Further, even when the number of views increases, the learning can be simply completed.

Furthermore, in the embodiment of the present technology, a foreground and a background in an image is disaggregated and learned as the foreground view model and the background view model, respectively. Therefore, for example, even when a background close to a foreground is included as in an actual moving image, the learning can be simply completed.

Accordingly, in the embodiment of the present technology, it is possible to execute the learning image process with a smaller amount of calculation compared to the related art.

The processes described above with reference to FIGS. 5 to 10 have hitherto been described on the supposition that a foreground and a background are each expressed by a single view model and the same view transform is executed on the foreground and the background. The processes described above with reference to FIGS. 11 to 16 have hitherto been described on the supposition that a foreground and a background are each expressed by a multi-view model and the same view transform is executed on the foreground and the background.

In effect, however, different view models and different view transforms may be applied to a foreground and a background.

For example, a view model may be learned by expressing a foreground by a multi-view model and a background by a single-view model and a multi-view model, respectively.

Alternatively, a dynamics learning estimation model such as HMM, FNN, or RNN may be used in the motion estimation of the foreground view transform. A dynamic estimation model such as a particle filter or a Kalman filter may be used in the motion estimation of the background view transform.

That is, as a modification, the configuration of the background estimation learning unit 205 of the view model learning apparatus 200 in FIG. 4 may be substituted by the configuration of the background estimation learning unit 105 of the view model learning apparatus 100 in FIG. 3. Further, for example, as a modification, the view transform motion estimating unit 216 and the view transition estimating unit 217 of the foreground estimation learning unit 204 may be integrated and the estimation may be realized in accordance with a method different from that of the view transition estimation and the view transform motion estimation of the background estimation learning unit 205.

In this way, the view model learning and the image recognition executed using the result of the learning according to the embodiment of the present technology may be modified in various forms. Hereinafter, examples will be described in which the view model and the view, transform of a foreground and the view model and the view transform of a background are specifically set and the view models are learned to recognize an image.

That is, first to third specific examples will be described as examples of specific view model learning and image recognition of an image processing apparatus to which the embodiment of the present technology is applied.

First Specific Example

Figure 17:
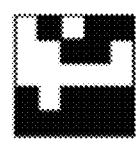
FIG. 17 is a diagram illustrating an example of a foreground image.
Figure 18:
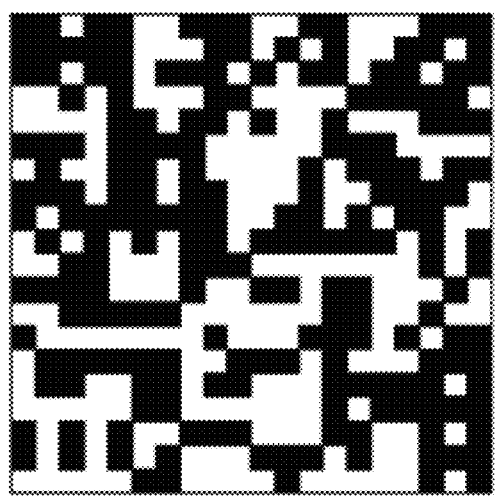
FIG. 18 is a diagram illustrating an example of a background image.

In a first specific example, a region where a foreground image is present is recognized by inputting and learning a moving image in which a foreground image shown in FIG. 17 is moving against a background image shown in FIG. 18.

In this case, the view model learning apparatus 100 in FIG. 3 learns a foreground as a single view model and also learns a background as a single view model, and then recognizes the foreground image using the view model which is the learning result.

When the image is recognized after the learning of the view model, the view transform is also estimated or the view transition is also estimated, as in the view model learning. However, when the image is recognized, only one candidate of the view transform or the view transform is generally output.

The foreground image shown in FIG. 17 is an image which is formed by a rectangular region of 5 by 5 pixels and has a predetermined pattern in which the respective pixels are white and black.

The background image shown in FIG. 18 is an image which is formed by a rectangular region of 20 by 20 pixels and has a predetermined pattern in which the respective pixels are white and black.

Here, it is assumed that the following moving image is input to the image series inputting unit 101. That is, an input image at each time is a series of input images, in which a foreground is displayed repeatedly at predetermined positions of a background and the foreground is moving against the background by stochastically moving the position of the foreground by one pixel in one of the upper, lower, right, and left directions at the subsequent time.

In the first specific example, accordingly, it is supposed that the background (or a camera) does not move and the foreground is just translated. In the first specific example, the result obtained by converting the binary pattern (0 or 1) of the series of input images into the gray scale pattern (a continuous value in the range of 0 to 1) is used as an image feature. Further, the foreground view model $M_{FG}$ and the background view model $M_{BG}$ are a rectangular region which has a predetermined number of pixels and in which the luminance value (pixel value) of each pixel is a continuous value in the range of 0 to 1.

Figure 19:
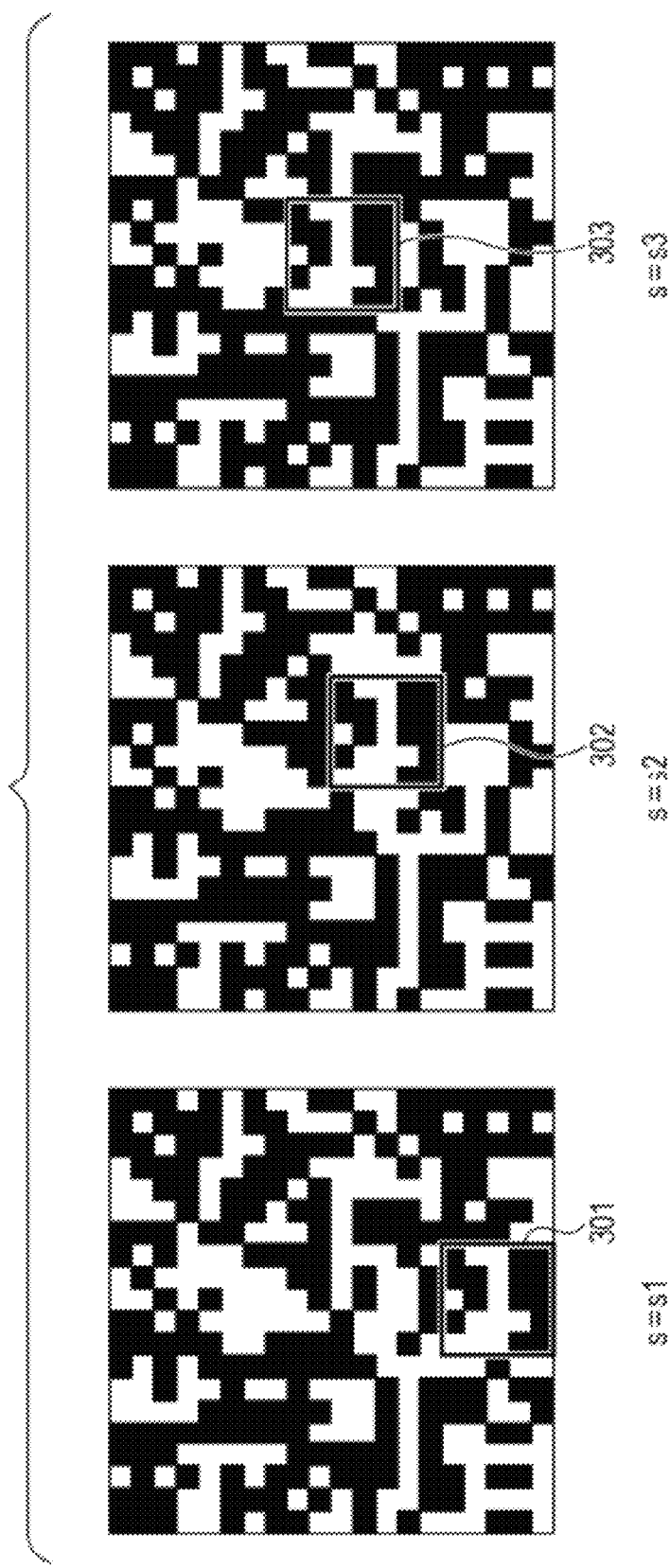
FIG. 19 is a diagram illustrating an example of an image included in a series of input images.

The foreground shown in FIG. 17 is synthesized on the background shown in FIG. 18 to form chronological images shown in FIG. 19, and then the images are input into the view model learning apparatus 100. Images shown in FIG. 19 are images at three times extracted from the images input as the moving image. In FIG. 19, the foreground image is displayed in a region 301 located in the lower portion of the middle of the image at a time s=s1. The foreground image is displayed in a region 302 located in the slight lower right portion of the middle of the image at a time s=s2. The foreground image is displayed in a region 303 located in the middle of the image at a time s=s3.

The image feature extracting unit 102 extracts the result obtained by converting the binary pattern of the series of input images into the gray scale pattern as the image feature, as described above. For example, the image feature extracting unit 102 extracts the image feature $X_s$ at the time s.

The foreground background synthesis observation unit 103 synthesizes the estimated foreground view estimated by the foreground estimation learning unit 104 and the estimated background view estimated by the background estimation learning unit 105. The estimated foreground view can be obtained by executing the predetermined view transform Tk on the foreground view model $M_{FG}$. In this case, since there is motion in the background, the background view model $M_{BG}$ can be used as the estimated background view without change. The foreground background synthesis observation unit 103 forms the synthesized view model $M_{k,FGBG}$ of the foreground and the background.

The synthesized view model $M_{k,FGBG}$ is obtained by Expression (14).

$$M_{k,FGBG} = M_{BG} \oplus T_k M_{FG} \quad (14)$$

The operator in which + is surrounded by a circle in Equation (14) means the following calculation. That is, the geometric model $TkM_{FG,G}$ of the foreground view model $M_{FG}$ subjected to the view transform Tk and the feature point $M'_{BG,G}$ of the background view model $M_{BG}$ geometrically corresponding to the geometric model $TkM_{FG,G}$ are obtained. In this case, the coordinate position of the background on which each pixel of the foreground overlaps is obtained as the feature point $M'_{BG,G}$. Further, a feature amount $M'_{BG,F}$ of the feature point $M'_{BG,G}$ is substituted by a feature amount model $M_{FG,F}$ of the foreground view model $M_{FG}$.

That is, the luminance value of each pixel at the coordinate position of the background on which each pixel of the foreground overlap is substituted by the luminance value of each, pixel of the foreground.

Since it is supposed that the foreground is just translated here, as described above, the view transform Tk in Equation (16) is expressed by the affine transform in Equation (15).

$$T_k = \begin{pmatrix} 1 & 0 & u_k \\ 0 & 1 & v_k \\ 0 & 0 & 0 \end{pmatrix} \quad (15)$$

The foreground background synthesis observation unit 103 calculates the likelihood $P(X_s|M_{k,FGBG})$ of the synthesized view model $M_{k,FGBG}$ of the foreground and the background as an evaluation value. Further, the likelihood $P(X_s|M_{k,FGBG})$ is calculated as the evaluation value. In this case, since the likelihood of the synthesized view model $M_{k,FGBG}$ of the foreground and the background is synonymous with the likelihood $P(X_s|Tk)$ of the view transform Tk, the above-mentioned evaluation value can be calculated by Equation (16).

$$P(X_s|T_k) = P(X_s|M_{k,FGBG}) = \frac{1}{D} \exp\left(-\frac{\sum_{i,j}^{c_{FGBG,a}} (x_{s,i} - (m_{k,FGBG,j}))^2}{2\sigma^2}\right) \quad (16)$$

In Equation (16), σ and D are parameters determined in advance. In Equation (16), $C_{FGB,s}$ represents the correspondent relation between the image at the time s in the series of the input images and the synthesized view model. That is, the numerator of the rightmost side of Equation (16) means the sum of the squares of the differences between the luminance values of the respective pixels of the image at the time s in the series of input images and the luminance values of the respective pixels corresponding to the synthesized view model of the foreground and the background.

The view transform estimation of the view transform estimating unit 114 and the view model learning of the view model learning unit 111 are executed based on the likelihood calculated by Equation (16).

In the first specific example, the estimation of the view transform estimating unit 114 and the view transform motion estimating unit 115 are executed in accordance with an HMM algorithm.

Since it is supposed that the foreground is just translated, as described above, an HMM state transition probability table is prepared in which the positions of the foreground view model correspond in the background view model. In this case, the state transition probability table describes, for example, a transition probability from a view transform Ta to a view transform Tb and a transition probability from the view transform Ta to a view transform Tc. That is, the table is prepared which describes a probability of transition from a node at the time s to a node at a time s+1 when each of the plurality of view transforms (for example, one translation to the right side, one translation to the left side, and the like) is an inner state node of HMM.

At this time, in the state transition probability table, a restriction is added in which the inner state nodes of HMM are arranged in a two-dimensional lattice shape and a transition probability other than a transition probability from a node to an adjacent node in the two-dimensional lattice shape of the transition probabilities between the inner state nodes is zero.

The view transform estimation described below is executed by storing such a state transition probability table in advance in the view transform motion estimating unit 115 and operating the state transition probability table in cooperation with the view transform estimating unit 114.

The view transform estimation executed using. HMM is executed by calculating the posterior probability of the view transform to be output at a given time. The posterior probability of the view transform to be output at a given time can be calculated by Equation (17). That is, the posterior probability can be calculated based on an observation likelihood $P(X_s|Tk)$ at each state corresponding to each view transform and a transition probability $P(Tk|Tk-1)$ between the states.

Further, the posterior probability can be calculated based on a forward state probability α (Tk) and a backward state probability β (Tk) in HMM.

$$P(T_k | X_s) = \frac{P_{T_k} \cdot P(X_s | T_k)}{\sum_1^{N_X} P_{T_k} \cdot P(X_s | T_k)} \quad (17)$$

$$= \frac{\alpha(T_k)\beta(T_k)}{\sum_1^{N_X} \alpha(T_k)\beta(T_k)}$$

The forward state probability can be calculated in accordance with a forward algorithm, which is generally used for the calculation of the HMM state probability, by Equation (18). Further, the backward state probability can be calculated in accordance with a backward algorithm, which is generally used for the calculation of the HMM state probability, by Equation (19).

The forward algorithm and the backward algorithm are disclosed in detail in, for example, "Pattern Recognition and Machine Learning, P. 335, (Information Science and Statistics) by Christopher M. Bishop, Springer, N.Y., 2006" (which is referred to as Document A below).

$$\alpha(T_k) = P(X_s | T_k) \Sigma \alpha(T_{k-1}) P(T_k | T_{k-1}) T_{k-1} \quad (18)$$

$$\beta(T_k) = \sum_{T_{k+1}} \beta(T_{k+1}) P(X_s | T_{k+1}) P(T_k | T_{k+1}) \quad (19)$$

That is, when the image feature extracting unit 102 extracts the image feature $X_s$, for example, the view transform estimating unit 114 estimates the candidates of the plurality of view transforms. Each of the estimated candidates is calculated with reference to the HMM state transition probability table by Equation (18) and Equation (19). In this way, it is possible to obtain the forward state probability α (Tk) and the backward state probability β (Tk) for each of the candidates of the view transforms.

The view transform motion estimating unit 115 calculates the posterior probability for each candidate of the view transform by executing the calculation of Equation (17). For example, when the view transform estimating unit 114 outputs the candidates, the view transform estimating unit 114 selects and outputs the view transforms by the number of candidates to be output based on the posterior probability of the transform.

In this way, the view transform is executed on the foreground view model using the candidate of the estimated view transform.

Further, the view model learning is executed as follows.

The view model learning unit 111 obtains the posterior probability $P(T_{FG,k} | X_s)$ of each view transform $T_{FG,k}$ executed on the foreground view model in regard to the image feature $X_s$ at each time and calculates the view model parameter of the foreground view model $M_{FG}$ of the foreground through the calculation expressed by Equation (20).

$$M_{FG} = \frac{1}{S} \sum_{s=1}^{S} \sum_{k=1}^{N_T} P(T_{FG,k} | X_s) \cdot T_{FG,k}^{-1} C_{X,FGBG,s} X_s \quad (20)$$

In Equation (20), $C_{X,FGBG,s}$ indicates that the image feature corresponding to the foreground is extracted from the image feature $X_s$ at time s.

The view model learning unit 121 obtains the posterior probability $P(T_{BG,k} | X_s)$ of each view transform $T_{BG,k}$ executed on the foreground view model in regard to the image feature $X_s$ at each time and calculates the view model parameter of the background view model $M_{BG}$ of the background through the calculation expressed by Equation (21).

$$M_{BG} = \frac{1}{S} \sum_{s=1}^{S} C_{X,FGBG,s} X_s \quad (21)$$

Figure 20:
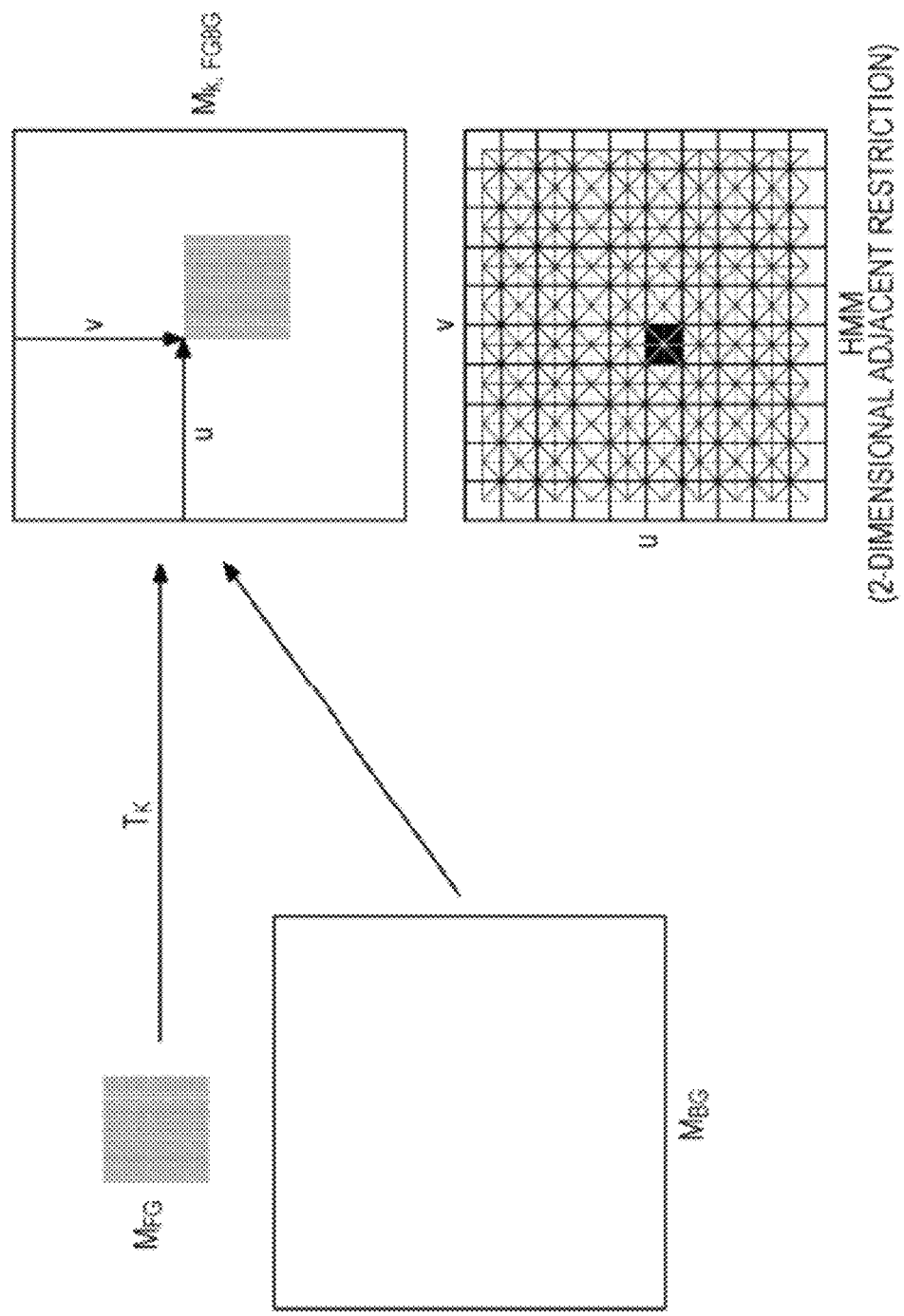
FIG. 20 is a diagram illustrating the structure of view transform estimation in view model learning and image recognition.

FIG. 20 is a diagram illustrating a mechanism of the view transform estimation in the view model learning and the image recognition in the first specific example.

As shown in FIG. 20, the view transform Tk is executed on the foreground view model $M_{FG}$ and the result obtained as the estimated foreground view is synthesized into the background view model $M_{GB}$. In this way, the synthesized view model $M_{k,FGBG}$ is formed.

A hatched rectangular figure in the upper left side of FIG. 20 indicates the foreground view model $M_{FG}$. A white rectangular figure in the lower left side of FIG. 20 indicates the background view model $M_{BG}$. A rectangular figure in the upper right side of FIG. 20 indicates the synthesized view model $M_{k,FGBG}$.

Since it is supposed that the foreground is just translated, as described above, the view transform Tk is expressed by the affine transform in Equation (15). Accordingly, the estimated foreground view is an image shown when the foreground view model $M_{FG}$ is moved to several positions without change. At this time, the position of the upper left vertex of the rectangular foreground can be expressed by a distance (or the number of pixels) u measured from the left side of the rectangular background and a distance (or the number of pixels) v measured from the upper side of the rectangular background.

In this case, the state transition probability table is a table shown in the lower right side of FIG. 20. That is, the above-described v value is specified by the horizontal axis of the state transition probability table and the above-described u value is specified by the vertical axis of the state transition probability table. Each node of the state transition probability table means the view transform of moving (translating) the position of the upper left vertex of the foreground to a position (u, v). Then, transition probability between the nodes is described.

In the state transition probability table, as described above, a restriction is added in which the inner state nodes of HMM are arranged in a two-dimensional lattice shape and a transition probability other than a transition probability from a node to an adjacent node in the two-dimensional lattice shape of the transition probabilities between the inner state nodes is zero. Thus, the efficiency of the state estimation can be improved.

In the first specific example, for example, the forward state probability α (Tk) and the backward state probability β (Tk) for each of the candidates of the view transforms can be simply obtained, since the algorithm of HMM is used in the view transform estimation. As a result, the view transform can be more efficiently estimated since the posterior probability for each candidate of the view transform in Equation (17) can be simply calculated. Further, the HMM state transition probability is updated based on the forward state probability and the backward state probability, as in general HMM learning.

Figure 21:
FIG. 21 is a diagram illustrating an image recognition result.

FIG. 21 is a diagram, illustrating an example of the result of the image recognition in the first specific example. FIG. 21 shows another example of the moving image in which the foreground image shown in FIG. 17 is being moved in the background image shown in FIG. 18. Images shown in FIG. 21 are images at three times extracted from the images input as the moving image. The motion of the foreground shown in FIG. 21 is assumed to be different from that of the foreground shown in FIG. 19.

As shown in FIG. 21, the foreground image is recognized within the frame line of each of the images at a time s=s11, a time s=s12, and a time s=s13.

Second Specific Example

In a second specific example, the configuration of the background estimation learning unit of the view model learning apparatus 200 in FIG. 4 is used, which is configured to be the same as the configuration of the background estimation learning unit 105 in FIG. 3. It is assumed that the view model learning apparatus 200 learns a foreground as the multi-view model and learns a background as the single view model, and then recognizes the foreground image using the view model which is the learning result.

When the image is recognized after the learning of the view model, the view transform is estimated or the view transition is estimated, as in the case where the view model is learned. However, when the image is recognized, only one candidate of the view transform or the view transform is generally output.

In the second specific example, HMM is used in the view transition estimation of the foreground, a particle filter is used in the view transform estimation of the foreground, and a particle filter is used in the view transform estimation of the background.

Figure 22:
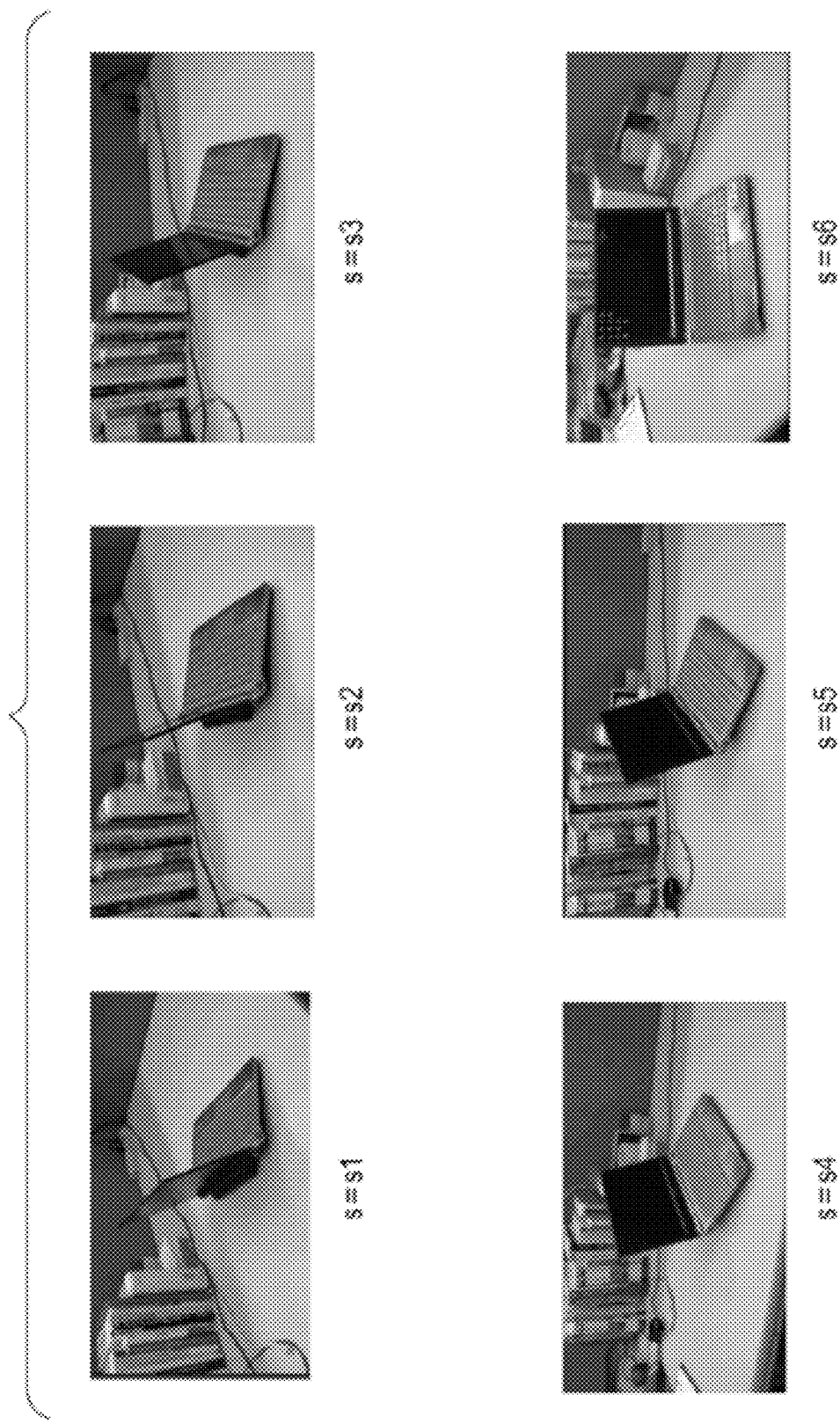
FIG. 22 is a diagram illustrating examples of images included in another series of input images.

FIG. 22 is a diagram illustrating examples of images used as a series of input images in the second specific example. As shown in FIG. 22, the series of the input images are images obtained, for example, by moving a camera to different positions around a notebook-type personal computer and photographing the notebook-type personal computer at various angles. For example, the images at a time s=s1 to a time s=s6 are obtained by moving the camera from the left side so as to face the notebook-type personal computer and photographing a moving image.

In the case of the second specific example, the notebook-type personal computer is learned as a foreground. A desk on which the notebook-type personal computer is installed and books or the like form a setting for the notebook-type personal computer are learned as a background.

The series of input images shown in FIG. 22 include images (views) obtained by viewing the notebook-type personal computer as the foreground at various angles. Further, it is supposed that the foreground of the series of input images is relatively translated with respect to the background to be expanded or reduced with the movement of the camera.

On the other hand, it is supposed that the background of the series of input images is translated with the movement of the camera.

In the second specific example, the result obtained by converting the RGB pattern of the series of input images into a gray scale pattern (a continuous value in the range of 0 to 1) is used.

Each of the view model parameters of view models $\{M_{FG,1}, M_{FG,2}, \ldots, M_{FG,L}\}$ of the foreground multi-view model $M_{FG,V}$ includes the coordinate value (position) and the luminance value (pixel value) of each pixel of a rectangular region with a predetermined size.

The background view model $M_{BG}$ is a rectangular image with an area larger than that of the background image being displayed in the image at each time in FIG. 22. The coordinate value (position) and the luminance value (pixel value) of each pixel are view model parameters.

In the case of the second specific example, the series of input images shown in FIG. 22 are input into the image series inputting unit 201. The image feature extracting unit 202 extracts, as the image feature, the result obtained by converting the RGB pattern of the image at each time in the series of input images into the gray scale pattern.

The foreground, background synthesis observation unit 203 synthesizes the estimated foreground view output from the foreground estimation learning unit 204 and the estimated background view output from the background estimation learning unit 105 to form a synthesized view model $M_{FGBG}$.

The synthesized view model $M_{FGBG}$ is obtained by Expression (22).

$$M_{FGBG} = T_{BG,k} M_{BG} \oplus T_{FG,k} M_{FG,v} \qquad (22)$$

The operator, in which + is surrounded by e circle Equation (22) means the following calculation. That is, the geometric model $T_{FG,k} M_{FG,v,G}$ of the foreground multi-view model $M_{FG,v}$ subjected to the view transform $T_{FG,k}$ and the feature point $M'_{BG,G}$ of the background view model $M_{BG}$, which is the feature point geometrically corresponding to the geometric model $T_{FG,k} M_{FG,v,G}$ and subjected to the view transform $T_{BG,k}$ are obtained. In this case, the coordinate position of the background on which each pixel of the foreground overlaps is obtained as the feature point $M'_{BG,G}$. Further, a feature amount $M'_{BG,F}$ of the feature point $M'_{BG,G}$ is substituted by a feature amount model $M_{FG,v,F}$ of the foreground view model $M_{FG,v}$.

That is, the luminance value of each pixel at the coordinate position of the background on which each pixel of the foreground overlap is substituted by the luminance value of each pixel of the foreground.

Since it is supposed that the foreground is translated to be expanded or reduced here, as, described above, the view transform $T_{FG,k}$ in Equation (22) is expressed by the affine transform in Equation (23).

$$T_{FG,k} = \begin{pmatrix} s1_{FG,k} & 0 & u_{FG,k} \\ 0 & s2_{FG,k} & v_{FG,k} \\ 0 & 0 & 0 \end{pmatrix} \qquad (23)$$

Further, since it is supposed that the background is just translated here, as described above, the view transform $T_{BG,k}$ in Equation (22) is expressed by the affine transform in Equation (24).

$$T_{BG,k} = \begin{pmatrix} 1 & 0 & u_{BG,k} \\ 0 & 1 & v_{BG,k} \\ 0 & 0 & 0 \end{pmatrix} \qquad (24)$$

The foreground background synthesis observation unit 203 calculates the likelihood $P(X_s | M_{FGBG})$ of the synthesized view model $M_{FGBG}$ at the time s by Equation (25) and Equation (26). Further, the likelihood associated with the view transform necessary for the calculation Equation (27)

described below and the likelihood associated with the view model necessary for the calculation of Equation (30) are calculated based on the rightmost side of Equation (26) (variables other than the targets for which the likelihood is necessary are calculated by marginalization).

$$P(Xx|T_{BG,k},T_{FG,k},M_{FG,v}) = P(X_s|M_{FGBG}) \quad (25)$$

$$P(X_s|T_{BG,k},T_{FG,k},M_{FG,v}) = \quad (26)$$

$$P(X_s|M_{FGBG}) = \frac{1}{D}\exp\left(-\frac{\sum_{i,j}^{C_{FGBG,s}}(x_{s,i}-(m_{FGBG,j}))^2}{2\sigma^2}\right)$$

In Equation (26), σ and D are parameters determined in advance. In Equation (26), $C_{FGBG,s}$ represents the correspondent relation between the image at the time s in the series of the input images and the synthesized view model $M_{FGBG}$. The likelihood obtained by Equation (26) is used as an evaluation value.

Next, the view transform estimation and the view transition estimation of the foreground will be described.

The view and transform estimating unit 215 and the view transform motion estimating unit 216 execute the view transform estimation as follows.

A particle filter is prepared in which four parameters of the view transform $T_{FG,k}$ on the supposition of translation, expansion, and reduction are used as state amounts. Here, the four parameters correspond to the component at the first row and first column, the component at the first row and third column, the component at the second row and second column, and the component at the second row and third column in the matrix of the right side of Equation (23) described above. Since the combinations of the four parameters specifying the foreground view transform can correspond to respective particles of the particle filter, one view transform is specified by specifying one particle.

Further, for example, the particle filter is well used as target tracking in the image recognition. The particle filter is disclosed in detail in, for example, P. 364 And the like of Document A.

The view transform estimation executed using the particle filter is executed by calculating the posterior probability of a view transform at a given time and calculating the posterior probability of a view transform at the subsequent time.

The posterior probability of a view transform at a given time (time s) can be approximated by a posterior probability $w^{(l)}_s$ of the particle sampled at this time. The posterior probability of the particle sampled at the time s can be calculated based on the likelihood associated with the view transform at the time s by Equation (27). Further, the view and transform estimating unit 215 calculates the likelihood associated with the view transform based on the evaluation value calculated by the foreground background synthesis observation unit 203, as described above.

$$P(T^{(l)}_{s,k}|X_s) \approx w^{(l)}_s = \frac{P(X_s|T^{(l)}_{s,k})}{\sum_{m=1}^{M}P(X_s|T^{(m)}_{s,k})} \quad (27)$$

In Equation (27), the likelihood associated with the view transform at the time s is expressed by $P(X_s|T^{(l)}_{s,k})$ or $P(X_s|T^{(m)}_{s,k})$. In Equation (27), (l) and (m) indicate an index of a particle and a total of M particles is present. As described above, since each view transform can correspond to each particle, the index of the particle is granted to the view transform.

The probability used for sampling the view transform at the subsequent time (time s+1) is calculated based on the posterior probability $w^{(l)}_s$ of the particle sampled at the time S and calculated by Equation (27) and a state update rule $F(T^{(l)}_{s+1,k}|T_{s,k})$ by Equation (28).

$$P(T_{s+1,k}|X_s) \approx \sum_{l}^{M} w^{(l)}_s F(T_{s+1,k}|T^{(l)}_{s,k}) \quad (28)$$

Here, for example, the state update rule is given for the state amount $x_s$ of the view transform $T_{s,k}$ at the time s in Equation (29).

$$x_{s+1} = x_s + ND(0,\sigma) \quad (29)$$

This equation indicates that the state amount $x_s$ is in the vicinity of a normal distribution of the dispersion a of the state amount $x_s$ at the time s+1. For example, when the motion of a foreground to be recognized, is gentle, the state update rule is valid. On the other hand, when the motion of the foreground to be learned and recognized is deviated from the supposition, it is necessary to design the state update rule in consideration of the motion of the foreground to be learned and recognized or learn a state update model from a sample.

The view transform motion estimating unit 216 calculates the posterior probability of the view transform at the time s+1 for each kind (the combinations of the four parameters) of view transform. For example, when the view and transform estimating unit 215 outputs the candidates of the view transform, the view transforms are selected and output by the number of candidates to be output based on the posterior probability of the view transform at the time s+1.

In this way, the view transform is executed on the foreground view model using the candidates of the estimated view transform.

Here, the case has hitherto been described in which it is supposed that the particle filter is individually applied to the foreground and the background. However, to generate the synthesized view model, a particle is selected from a particle for the foreground and a particle for the background stochastically (for example, based on a uniform distribution probability). Then, the synthesized view model of the foreground and the background is formed based on the state amount of the view transform parameter of the selected particle.

The view and transform estimating unit 215 and the view transition estimating unit 217 execute the view transition estimation as follows.

The HMM state transition probability table is prepared in which each of the plurality of view models in the foreground multi-view model is the inner state node of HMM. In this case, the state transition probability table describes, for example, a transition probability from a view model Ma to a view model Mb, a transition probability from the view model Ma to a view model Mc.

At this time, in the state transition probability table, a restriction is added in which the inner state nodes of HMM are arranged in a two-dimensional lattice shape and a transition probability other than a transition probability from a node to an adjacent node in the two-dimensional lattice shape of the transition probabilities between the inner state nodes is zero. This is because it can be supposed that a foreground is supposed to have a three-dimensional structure, and thus, the transition between the plurality of views made from the three-dimensional structure is supposed to be executed on the two-dimensional structure covering the three-dimensional structure. More precisely, a method of arranging the node's on a spherical surface can be used.

For example, as described below, the view transition estimation is executed by storing the state transition probability table in the view transition estimating unit 217 and operating in cooperation with the view and transform estimating unit 215.

The view estimation by the use of HMM is executed by calculating the posterior probability of the view model at a given time. The posterior probability of the view model at the given time can be calculated based on the observation likelihood $P(X_s|M_{FG,v})$ at each state and the transition probability $P(M_{FG,v}|M_{FG,v}')$ between the states. Further, the posterior probability of the view model at the given time can be calculated using a forward state probability $\alpha(M_{FG,v})$ and a backward state probability $\beta(M_{FG,v})$ in HMM by Equation (30).

$$P(M_{FG,v}|X_s) = \frac{P_{M_{FG,v}} \cdot P(X_s|M_{FG,v})}{\sum_{1}^{L} P_{M_{FG,v}} \cdot P(X_s|M_{FG,v})} = \frac{\alpha(M_{FG,v})\beta(M_{FG,v})}{\sum_{1}^{L} \alpha(M_{FG,v})\beta(M_{FG,v})} \tag{30}$$

The forward state probability can be calculated in accordance with a forward algorithm generally used for the calculation of the HMM state probability by Equation (31). The backward state probability can be calculated in accordance with a backward algorithm generally used for the calculation of the HMM state probability by Equation (32).

$$\alpha(M_{FG,v}) = P(x_s|M_{FG,v})\Sigma \alpha(M_{FG,v'})P(M_{FG,v}|M_{FG,v'}) \tag{31}$$

$$\beta(M_{FG,v}) = \Sigma \beta(M_{FG,v''})P(X_s|M_{FG,v''})P(M_{FG,v}|M_{FG,v''}) \tag{32}$$

That is, when the image feature extracting unit 202 extracts the image feature $X_s$ at the time s, for example, the view and transform estimating unit 215 estimates the candidates of the plurality of view transitions. Each of the estimated candidates is calculated with reference to the HMM state transition probability table by Equation (31) and Equation (32). In this way, the forward state probability $\alpha(M_{FG,v})$ and the backward state probability $\beta(M_{FG,v})$ for each candidate of the view transform can be obtained.

In this way, the view transition estimating unit 217 calculates the posterior probability of the view transform to be transitioned at the subsequent time for each view model. For example, when the view and transform estimating unit 215 outputs the candidates of the view transition, the view models are selected and output by the number of candidates to be output based on the posterior probability of the view model to be transitioned at the subsequent time.

The view transform by the use of the candidates of the view transform estimated in the above-described manner is executed on the foreground view model for which the view transition is estimated and output.

Next, the background view transform will be described.

The view transform estimating unit 124 and the view transform motion estimating unit 125 execute the view transform estimation as follows.

A particle filter is prepared in which two parameters of the view transform $T_{BG,k}$ in which translation is supposed are used as state amounts. Here, the two parameters correspond to the component at the first row and third column and the component at the second row and third column in the matrix of the right side of Equation (24) described above.

As in the foreground view transform, the posterior probability of a particle to be sampled at the subsequent time is calculated and each view transform is output as a candidate based on the posterior probability.

In this way, the view transform is executed on the background view model using the candidates of the estimated view transform.

Here, the case has hitherto been described in which it is supposed that the particle filter is individually applied to the foreground and the background. However, to generate the synthesized view model, a particle is selected from a particle for the foreground and a particle for the background stochastically (for example, based on a uniform distribution probability). Then, the synthesized view model of the foreground and the background is formed based on the state amount of the view transform parameter of the selected particle.

Next, the view model learning will be described.

The multi-view model view transition learning unit 211 calculates the view model parameters of each view model of the foreground multi-view model as follows.

That is, the multi-view model view transition learning unit 211 calculates the view model parameters of the view model $M_{FG,v}$ of the multi-view model based on the posterior probability of the view transform and the posterior probability of the view model obtained in the above-described manner by Equation (33).

$$M_{FG,v} = \frac{1}{S}\sum_{s=1}^{S}\sum_{k=1}^{N_T} P(M_{FG,v}|X_s)P(T_{FG,k}|X_s) \cdot T_{FG,k}^{-1} C_{X,FGBG,s} X_s \tag{33}$$

In Equation (33), the view transform executed on the foreground view model is indicated by $T_{FG,k}$ and a total of NT view transforms is present. For example, the view model parameters of one view model are calculated among L view models of the multi-view model by Equation (33). Accordingly, the calculation of Equation (13) is executed by the number of view models of the multi-view model.

Further, the view model learning unit 121 calculates the view model parameters of the background view model as follows.

That is, the view model learning unit 121 calculates the view model parameters of the view model $M_{BG}$ by Equation (34) based on the posterior probability of the view transform calculated in the above-described manner.

$$M_{BG} = \frac{1}{S}\sum_{s=1}^{S}\sum_{k=1}^{N_T} P(T_{BG,k}|X_s) \cdot T_{BG,k}^{-1} C_{X,FGBG,x} X_s \tag{34}$$

In Equation (34), the view transform executed on the background view model is indicated by $T_{BG,k}$ and a total of NT view transforms is present.

Figure 23:
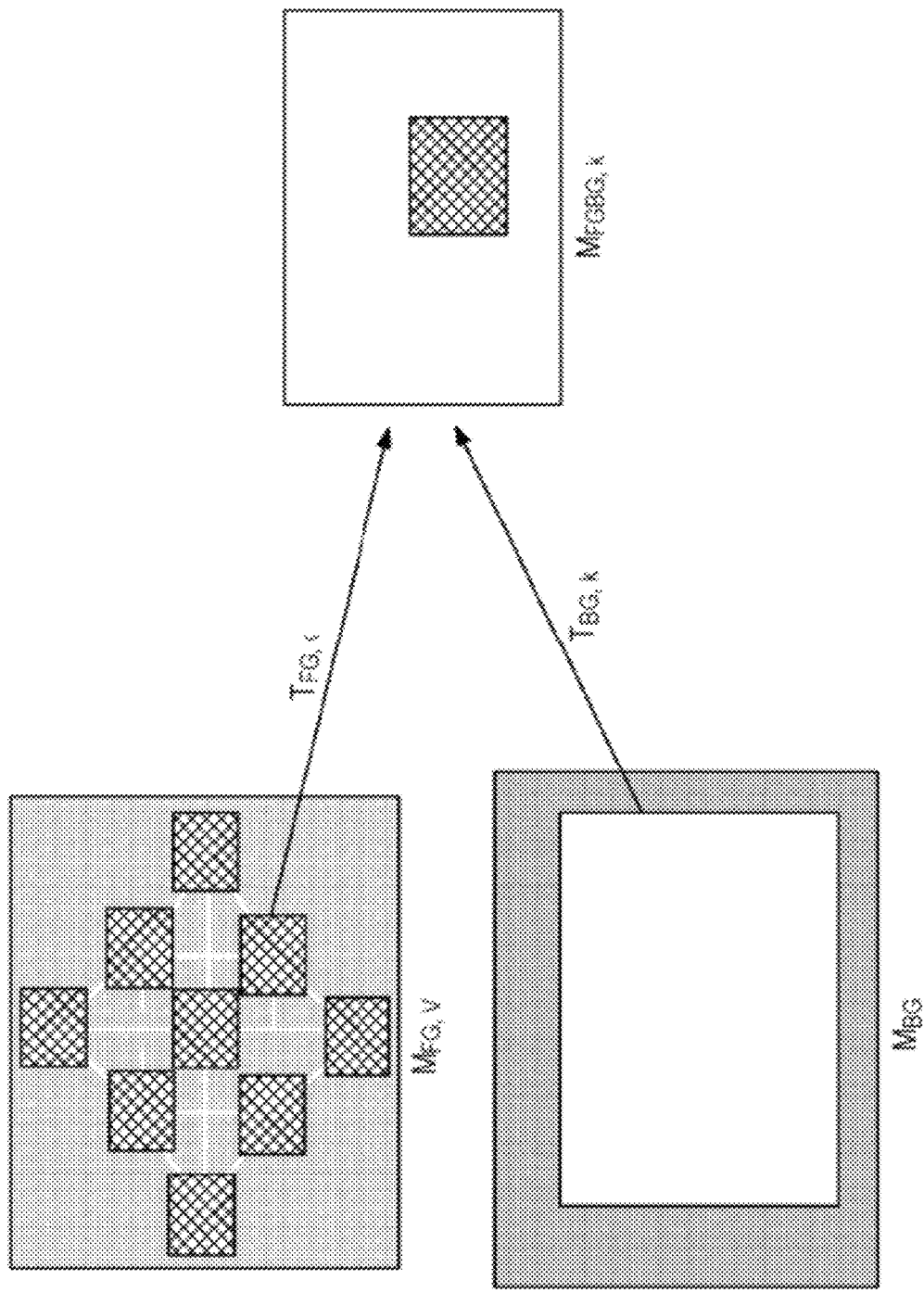
FIG. 23 is a diagram illustrating an example of the view model learning.

FIG. 23 is a diagram illustrating the view model learning in the second specific example.

In the second specific example, as shown in FIG. 23, the view transform $T_{FG,k}$ is executed on a predetermined view model of the foreground multi-view model $M_{FG,V}$. This view model is considered as an estimated foreground view. Further, the view transform $T_{BG,k}$ is executed on the background view model $M_{BG}$. This view model is considered as an estimated background view.

In this example, the foreground multi-view model is conceptually shown in the upper left side of the drawing. That is, in this case, the foreground multi-view model include nine view models. In the upper left part of the drawing, the nine view models as the view models of the foreground multi-view model $M_{FG,V}$ are shown as rectangular figures.

In this example, the background view model $M_{BG}$ is configured as a rectangular image which has an area larger than that of the background image displayed in the synthesized view model $M_{FGBG,k}$. That is, in the lower left part of the drawing, the entire size (area) of the background view model $M_{BG}$ is shown by a larger rectangular shape and the size (area) of a portion output as an estimated background view is shown by a smaller rectangular shape.

Then, the estimated foreground view and the estimated background view are synthesized to form a synthesized view model $M_{FGBG,k}$. That is, in the right part of the drawing, a white rectangular shape and a hatched rectangular shape are shown in an overlapping manner as the synthesized view model $M_{FGBG,k}$. The white rectangular shape is the estimated background view obtained by executing the view transform $T_{BG,k}$ on an image in a region extracted in the background view model $M_{BG}$ shown in the lower left part of the drawing. Further, the hatched rectangular shape is the estimated foreground view obtained by executing the view transform $T_{FG,k}$ on the view model selected in the foreground multi-view model $M_{FG}$ shown in the upper left part of the drawing.

In the second specific example, a particle filter is used for the view transform estimation of the foreground and the background. Therefore, for example, even when the parameters of the view transform are abundant, the view transform estimation can efficiently be executed. Further, for example, the posterior probability of the view transform shown in Equation (28) can be simply executed.

In the second specific example, the HMM algorithm is used for the estimation of the foreground view transition. Therefore, for example, the forward state probability $\alpha$ (Tk) and the backward state probability $\beta$ (Tk) for each candidate of the view transform can be simply obtained. As a result, since the posterior probability for each candidate of the view transition shown in Equation (30) can be simply executed, the view transform can be estimated more efficiently.

In the state transition probability table, as described above, the restriction is added in which the inner state nodes of HMM are arranged in the two-dimensional lattice shape and a transition probability other than a transition probability from a node to an adjacent node in the two-dimensional lattice shape of the transition probabilities between the inner state nodes is zero. Thus, the efficiency of the state estimation can be improved.

Figure 24:
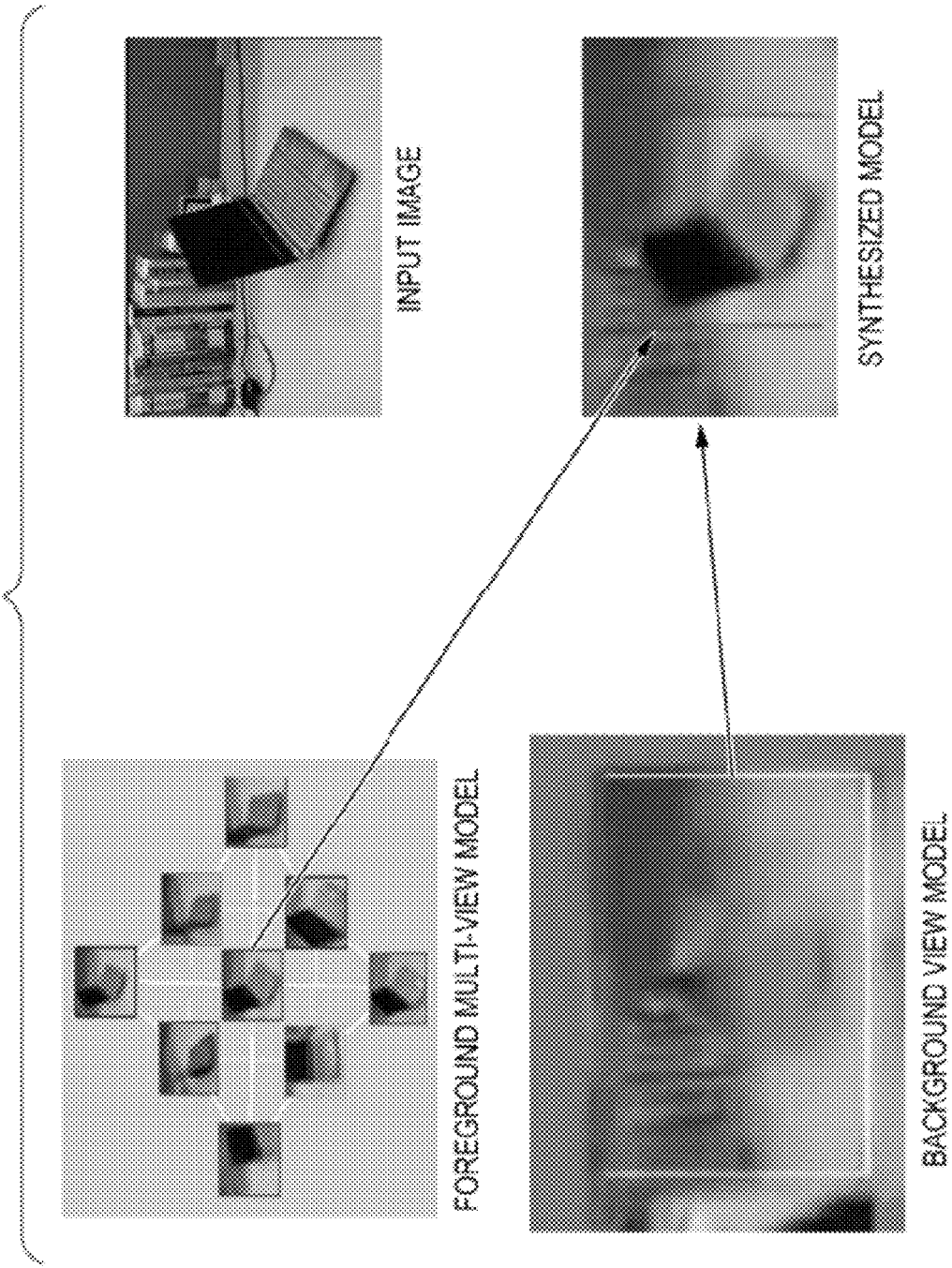
FIG. 24 is a diagram illustrating another example of the image recognition result.

FIG. 24 is a diagram illustrating the result obtained by inputting the series of input images shown in FIG. 22, learning the foreground multi-view model and the background view model, and recognizing an image in the second specific example. An image shown in the upper right part of FIG. 24 is an image which is input as an input to be learned.

As shown in the upper left part of FIG. 24, nine view models corresponding to images obtained by viewing a notebook-type personal computer at different angles are learned as a foreground multi-view model. Further, as shown in the lower left part of FIG. 24, a desk on which the notebook-type personal computer is installed and books or the like forms a setting for the notebook-type personal computer are learned as a background view mode.

In the view models shown in FIG. 24, the objects of the foreground and the background are vaguely displayed unlike the actual images. As described above, this is because the luminance value of each pixel which is the parameter of the view model is updated in a weighted manner based on the posterior probability of the view transform or the view transition.

As shown in the lower right part of FIG. 24, a synthesized view model is formed. That is, the synthesized view model is formed by displaying the estimated foreground view obtained by executing a predetermined view transform on the predetermined view models of the background and executing a predetermined view transform on the background view model in an overlapping manner.

In FIG. 24, it can be understood that the synthesized view model which is almost the same as the input image is formed, and thus the image can be appropriately learned and recognized.

Third Specific Example

In a third specific example, the view model learning apparatus 100 in FIG. 3 learns a foreground as a single view model and also learns a background as a single view model, and then recognizes the foreground image using the view model which is the learning result.

When the image is recognized after the learning of the view model, the view transform is also estimated, as in the view model learning. However, when the image is recognized, only one candidate of the view transform or the view transform is generally output.

In the third specific example, a local feature (Harris corner) is used as a view model and a particle filter is used for the view transform estimation.

Figure 25:
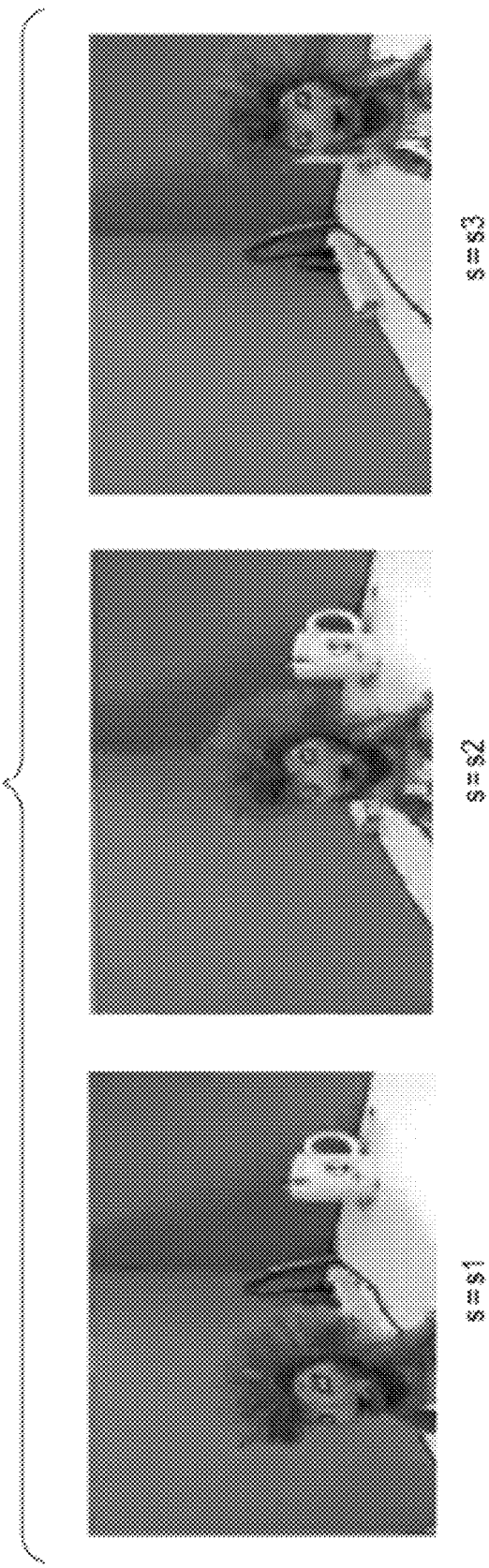
FIG. 25 is a diagram illustrating examples of images included in still another series of input images.

FIG. 25 is a diagram illustrating examples of images as a series of input images in the third specific example. As shown in FIG. 25, the series of input images is obtained by manually fixing the posture of a doll (stuffed toy) on a desk, moving the doll front, rear, right, and left, and photographing the doll with a camera. For example, images at a time s=s1 to a time s=s3 are obtained by gradually moving the doll and photographing a moving image.

In the third specific example, the doll is learned as a foreground. Further, a desk on which the doll is put and a coffee cup, table top, or the like form a setting for the doll are learned as a background.

In the third specific example, it is supposed that the doll as the foreground in the series of input images shown in FIG. 25 is relatively translated with respect to the background to be expanded or reduced.

On the other hand, it is supposed that the background in the series of input images is translated with the movement of the camera.

In the third specific example, the RGB pattern of each image of the series of input images is converted into the gray scale pattern (a continuous value in the range of 0 to 1) and the positions of feature points are detected through Harris corner detection. A set of the positions of the f detected feature points is used as an image feature. Points indicated in a cross shape or the like are plotted among the points of the doll, the desk, the coffee cup, and the table top in the images at the time 3=s1 to the time s=s3 in FIG. 25. The plotted points are the portions of the feature points detected through the Harris corner detection.

Here, the example has hitherto been described in which the feature points are detected through the Harris corner detection. However, other methods may be used to detect the feature points.

Accordingly, in the third specific example, it is not necessary to include the luminance value or the like of the pixel in the image feature. The image feature includes only the coordinate position or the like of each feature point. For example, an image feature X1 among image features $X_1, X_2, \ldots X_s$ at each time includes information regarding a set (x1, y9), (x18, y31), and the like of the coordinate positions of the feature points detected from the image at a time 1. Further, the image feature X1 includes information regarding a set (x3, y6), (x11, y38), and the like of the coordinate positions of the feature points detected from the image at the time 1. Therefore, in the third specific example, it is not necessary to include the feature amount model since it is sufficient for the view model parameter to include only a geometric model.

The edge of the image is generally detected as the feature point in the Harris corner detection. For example, the points of an edge in the image of the doll as the foreground and the points of an edge in the image of the coffee cup and the table top as the background are detected as the feature points.

In the third specific example, a set of the feature points of a first edge point, a second edge point, and the like in the image of the doll and a relative position relation between the respective feature points in a two-dimensional space is learned as a foreground view model. In the third specific example, a set of the feature points of a first edge point, a second edge point, and the like in the image of the coffee cup and the table top and a relative position relation between the respective feature points in a two-dimensional space are learned as a background view model.

As well as the geometric model (the coordinate position or the like), a feature amount model such as a steerable filter may be added as the information regarding the feature points.

In the third specific example, the series of input images shown in FIG. 25 is input into the image series inputting unit 101. The image feature extracting unit 102 detects the feature points through the Harris corner detection from the image at each time in the series of input images.

The foreground background synthesis observation unit 103 synthesizes the estimated foreground view estimated by the foreground estimation learning unit 104 and the estimated background view estimated by the background estimation learning unit 105 to form a synthesized view model $M_{FGBG}$.

The estimated foreground view can be obtained by executing the view transform $T_{FG,k}$ on the foreground view model $M_{FG}$ and is expressed as $T_{FG,k}M_{FG}$. The estimated background view can be obtained by executing the view transform $T_{BG,k}$ on the background view model $M_{BG}$ and is expressed as $T_{BG,k}M_{BG}$.

The synthesized view model $M_{FGBG}$ is obtained by Equation (35).

$$M_{FGBG} = T_{BG,k}M_{BG} \oplus T_{FR,k}M_{FG} \tag{35}$$

The operator in which + is surrounded by a circle in Equation (35) means addition calculation of two sets of the feature points. That is, both the image feature and the synthesized view model include the information regarding the positions of the feature points. Accordingly, the synthesized view model $M_{FGBG}$ is obtained by adding the set of the feature points indicated by the estimated foreground view $T_{FG,k}M_{FG}$ and the set of the feature points indicated by the estimated background view $T_{BG,k}M_{BG}$.

Here, as described above, since it is supposed that the foreground is translated to be expanded or reduced, the view transform $T_{FG,k}$ in Equation (35) is expressed by the affine transform in Equation (36).

$$T_{FG,k} = \begin{pmatrix} s1_{FG,k} & 0 & u_{FG,k} \\ 0 & s2_{FG,k} & v_{FG,k} \\ 0 & 0 & 0 \end{pmatrix} \tag{36}$$

Further, since it is supposed that the background is just translated here, as described above, the view transform $T_{BG,k}$ in Equation (35) is expressed by the affine transform in Equation (37).

$$T_{BG,k} = \begin{pmatrix} 1 & 0 & u_{BG,k} \\ 0 & 1 & v_{BG,k} \\ 0 & 0 & 0 \end{pmatrix} \tag{37}$$

The foreground background synthesis observation unit 103 calculates the likelihood $P(X_s|M_{FGBG})$ of the synthesized view model $M_{FGBG}$ at the time s by Equation (38) and Equation (39).

$$P(X_s|T_{BG,k},T_{FG,k}) = P(X_s|M_{FGBG}) \tag{38}$$

$$P(X_s | T_{BG,k}, T_{FG,k}) = \tag{39}$$

$$P(X_s | M_{FGBG}) = \frac{1}{D}\exp\left(-\frac{\sum_{i,j}^{C_{FGBG,s}}(x_{s,i} - (m_{FGBG,j}))^2}{2\sigma^2}\right)$$

In Equation (39), σ and D are parameters determined in advance. In Equation (39), $C_{FGBG,s}$ represents the correspondent relation between the feature points of the image at the time s in the series of the input images and the feature points of the synthesized view model $M_{FGBG}$. The likelihood obtained by Equation (39) is used as an evaluation value.

At this time, the correspondent relation between the feature points of the image at the time s in the series of the input images and the feature points of the synthesized view model $M_{FGBG}$ is determined, for example, in the following manner. That is, pairs of feature points are selected by an auction algorithm of a combination optimization algorithm so that the distances between the pairs of feature points corresponding to each other are lessened as a whole.

The auction algorithm is disclosed in detail in "Combination Optimization [collection of short articles], Chapter 3 Assignment Problem by Kubo Mikio and Matsui Tosiki, ISBN 978-4-254-12617-4C3341 Asakura Pub. on Jan. 10, 1999."

The likelihood based on the distances between the pairs of feature points corresponding to each other, as described above, is calculated by Equation (38) and Equation (39).

Next, the view transform of the foreground and the background will be described.

In regard to the foreground view transform, the view transform estimating unit 114 and the view transform motion estimating unit 115 execute the view transform estimation as follows.

A particle filter is prepared in which four parameters of the view transform $T_{FG,k}$ on the supposition of translation, expansion, and reduction are used as state amounts. Here, the four parameters correspond to the component at the first row and first column, the component at the first row and third column, the component at the second row and second column, and the component at the second row and third column in the matrix of the right side of Equation (36) described above. Since the combinations of the four parameters specifying the foreground view transform can correspond to respective particles of the particle filter, one view transform is specified by specifying one particle.

As described in the second specific example, the view transform estimation executed using the particle filter is executed by calculating the posterior probability of a view transform at a given time and calculating the posterior probability of a view transform at the subsequent time.

The posterior probability of a view transform at a given time (time s) can be approximated by a posterior probability $w^{(l)}_s$ of the particle sampled at this time. The posterior probability of the particle sampled at the time s can be calculated based on the likelihood associated with the view transform at the time s. Further, as described above, the view transform estimating unit 114 calculates the likelihood associated with the view transform based on the evaluation value calculated by the foreground background synthesis observation unit 103.

The probability used for sampling the view transform at the subsequent time (time s+1) is calculated based on the posterior probability $w^{(l)}_s$ of the particle sampled at the time s and the state update rule $F(T^{(l)}_{s+1}, k|T_{s,k})$.

The view transform motion estimating unit 115 calculates the posterior probability of the view transform at the time s+1 for each kind (the combinations of the four parameters) of view transform. For example, when the view transform estimating unit 114 outputs the candidates of the view transform, the view transforms are selected and output by the number of candidates to be output based on the posterior probability of the view transform at the time s+1.

In this way, the view transform is executed on the foreground view model using the candidates of the estimated view transform.

In regard to the background view transform, the view transform estimating unit 124 and the view transition estimating unit 125 executes the view transition estimation as follows.

A particle filter is prepared in which two parameters of the view transform $T_{BG,k}$ in which translation is supposed are used as state amounts. Here, the two parameters correspond to the component at the first row and third column the component at the second row and third column in the matrix of the right side of Equation (37) described above.

As in the foreground view transform, the posterior probability of a particle to be sampled at the subsequent time is calculated and each view transform is output as a candidate based on the posterior probability.

In this way, the view transform is executed on the foreground view model using the candidates of the estimated view transform.

Next, the view model learning will be described.

The view model view transition learning unit 111 calculates the view model parameters of the foreground view model as follows.

That is, the view model learning unit 111 calculates the view model parameters of the view model $M_{FG}$ based on the posterior probability of the view transform obtained in the above-described manner by Equation (40).

$$M_{FG} = \frac{1}{S}\sum_{s=1}^{S}\sum_{k=1}^{N_T} P(T_{FG,k}|X_s) \cdot T_{FG,k}^{-1} C_{X,FGBG,s} X_s \quad (40)$$

In Equation (40), the view transform executed on the foreground view model is indicated by $T_{FG,k}$ and a total of NT view transforms is present.

Further, the view model learning unit 121 calculates the view model parameters of the background view model as follows.

That is, the view model learning unit 121 calculates the view model parameters of the view model $M_{BG}$ by Equation (41) based on the posterior probability of the view transform calculated in the above-described manner.

$$M_{BG} = \frac{1}{S}\sum_{s=1}^{S}\sum_{k=1}^{N_T} P(T_{BG,k}|X_s) \cdot T_{BG,k}^{-1} C_{X,FGBG,s} X_s \quad (41)$$

In Equation (41), the view transform executed on the background view model is indicated by $T_{BG,k}$ and a total of NT view transforms is present.

Figure 26:
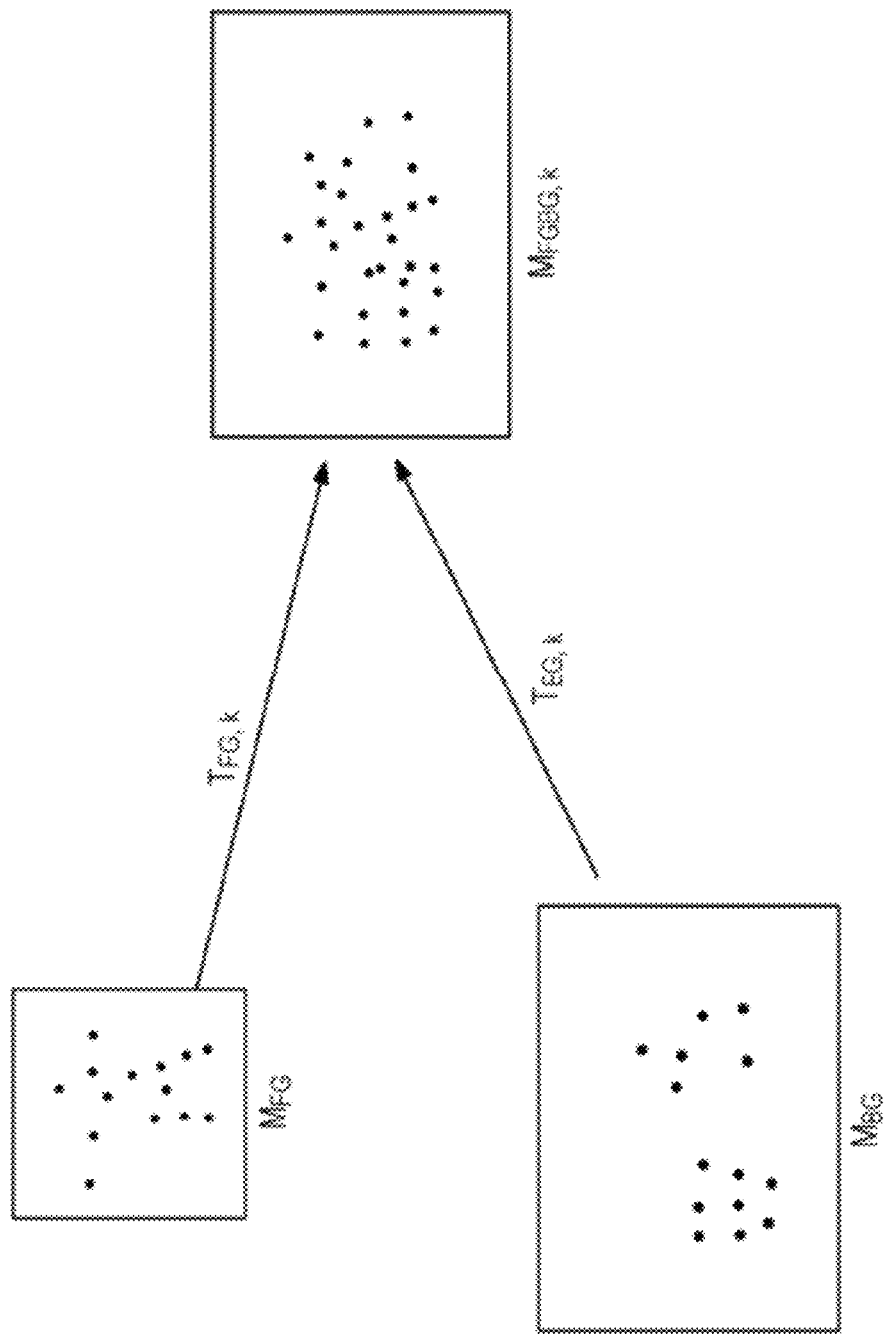
FIG. 26 is a diagram illustrating another example of the view model learning.
Figure 27:
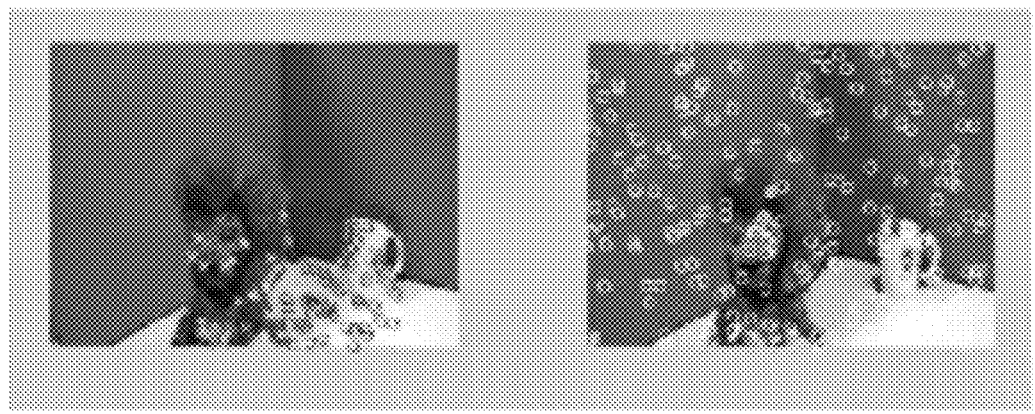
FIG. 27 is a diagram illustrating still another example of the image recognition result.
Figure 28:
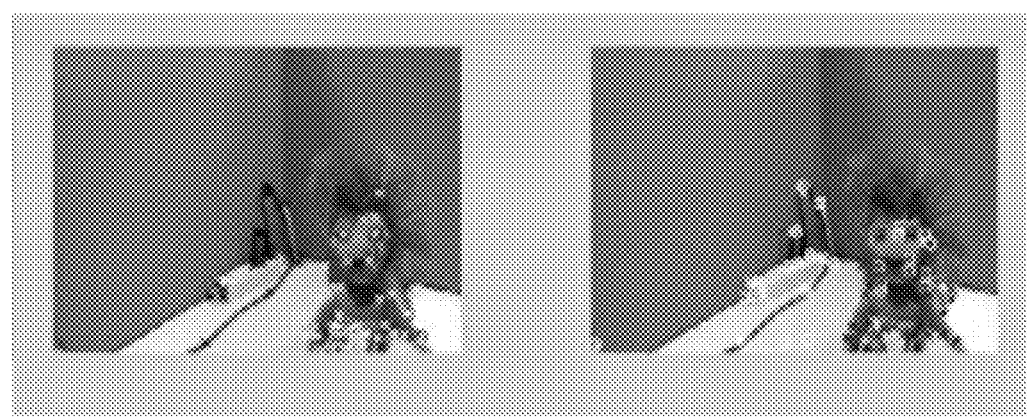
FIG. 28 is a diagram illustrating further still another example of the image recognition result.

FIGS. 26 to 28 are diagrams illustrating the view model learning in the third specific example.

In the third specific example, as shown in FIG. 26, the view transform $T_{FG,k}$ is executed on the foreground view model $M_{FG}$. This view model is considered as an estimated foreground view. Further, the view transform $T_{BG,k}$ is executed on the background view model $M_{BG}$. This view model is considered as an estimated background view.

In this example, a plurality of points are shown inside a rectangle shown in the upper left part of the drawing as the foreground view model $M_{FG}$. The respective points are the feature points which form the foreground view model.

In this example, a plurality of points are shown inside a rectangle shown in the lower left part of the drawing as the background view model $M_{BG}$. The respective points are the feature points which form the background view model.

Then, the estimated foreground view and the estimated background view are synthesized to form a synthesized view model $M_{FGBG,k}$. As described above, the synthesized view model is obtained by adding the set of the feature points in the estimated foreground view and the set of the feature points in the estimated background view. In this example, a plurality of points are shown inside a rectangle shown in the middle right part of the drawing as the synthesized view model $M_{FGBG,k}$. The points are the feature points which form the synthesized view mode.

In the third specific example, the local feature amount is used in the image feature or the view model parameter, unlike the first and second specific examples. Accordingly, compared to the first and second specific examples, robust recognition can be executed for a change in an environment such as an illumination condition. As a result, for example, it is possible to realize an apparatus capable of learning and recognizing an image at high speed at low cost.

FIGS. 27 and 28 are diagrams illustrating the result obtained by inputting the series of input images shown in FIG. 25, learning the foreground view model and the background view model, and recognizing the images in the third specific example.

In FIGS. 27 and 28, points recognized as the feature points of the foreground and the background are displayed as plotted points shown in a cross shape in the drawing or a circle in the drawing. In FIGS. 27 and 28, the plotted points indicated by a circular shape or the like displayed on the image in the left side (foreground estimation) of the drawing are points learned and recognized (estimated) as the feature points of the foreground. In FIGS. 27 and 28, the plotted points indicated by a circular shape or the like displayed on the image in the right side (background estimation) of the drawing are points learned and recognized (estimated) as the feature points of the background.

FIG. 27 shows the result obtained by recognizing the image in the early stage of learning and FIG. 28 shows the result obtained by recognizing the image after the sufficient learning.

In the early stage of learning, as shown in FIG. 27, for example, a part of the background is plotted as the feature point of the foreground in the estimated foreground image, and thus the part of the background is wrongly recognized as the foreground. For example, a part of the foreground is plotted as the feature point of the background in the estimated background image of FIG. 27, and thus the part of the foreground is wrongly recognized as the background. That is, in the early stage of learning, it can be understood that the foreground and the background are not appropriately recognized.

As shown in FIG. 28, however, it can be understood that the foreground and the background are nearly appropriately recognized after sufficient learning. That is, according to the recognition result shown in FIG. 28, it can be understood that the synthesized view model is obtained in which the feature amount of the foreground and the feature points of the background in the input images can be almost correctly plotted.

The examples of the specific view model learning and the image recognition in the image processing apparatus to which the first, second, and third specific examples of the present technology are applied have hitherto been described.

Of course, specific examples other than the above-described examples may be realized in effect. For example, a specific example may be realized in which a foreground is learned by a multi-view model and a background is learned by a multi-view model. For example, a specific example may be realized in which the motion of a foreground is supposed to be translation, expansion, and reduction and the motion of a background is supposed to be translation, expansion, and reduction.

Alternatively, rotation, projection, or the like may be supposed as the motions of a foreground and a background.

In this way, the view model learning according to the embodiment of the present technology and the image recognition executed using the learning result may be modified in various forms. Other specific examples may be realized with reference to the above-described specific examples. Accordingly, the specific examples may be disclosed in the same manner.

Further, the examples have hitherto been described in which one target (for example, a notebook-type personal computer) is learned and recognized as a foreground and one target (for example, a desk or a book) is learned and recognized as a background. However, for example, a plurality of targets may be learned or recognized as a foreground and a plurality of targets may be learned or recognized as a background.

The examples have hitherto been described in which the embodiment of the present technology is applied to image recognition. However, for example, the embodiment of the present technology may be applied to sensor information other than images. For example, the embodiment of the present technology may be applied to sensor information such as a tactile sensor using a pressure sensor or the like.

The above-described series of processes may be executed by hardware or software. When the above-described series of processes are executed by software, a program of the software is installed in a computer in which dedicated hardware is embedded or a general personal computer 700 or the like capable of executing various functions by installing various programs, as shown in FIG. 29, from a network or a recording medium.

In FIG. 29, a CPU (Central Processing Unit) 701 executes various processes in accordance with programs stored in a ROM (Read Only Memory) 702 or programs loaded on a RAM (Random Access Memory) 703 from a storage unit 708. In the RAM 703, not only are various processes executed by the CPU 701, but also necessary data or the like are appropriately stored.

The CPU 701, the ROM 702, and the RAM 703 are connected to each other via a bus 704. The bus 704 is also connected to an input/output interface 705.

An input unit 706 configured by a keyboard, a mouse, or the like, an output unit 707 configured by a display, a speaker, or the like, a storage unit 708 configured by a hard disk or the like, and a communication unit 709 configured by a network interface card such as a modem or a LAN card are connected to the input/output interface 705. The communication unit 709 executes communication through a network including the Internet.

A drive 710 is connected to the input/output interface 705, as necessary. A removable medium 711 such as a magnetic disk, an optical disk, a magneto-optical disk, or a semiconductor memory is appropriately mounted, so that a computer program read from the mounted removable medium 711 can be installed in the storage unit 708, as necessary.

When the above-described series of processes is executed by software, a program of the software is installed from a network such as the Internet or a recording medium such as a removable medium 711.

The recording medium includes the removable medium 711 such as a magnetic disk (including a floppy disk (registered trademark)), an optical disc (including a CD-ROM (Compact Disk-Read Only Memory) and a DVD (Digital Versatile Disk)), a magneto-optical disk (including an MD (Mini-Disk) (registered trademark)), or a semiconductor memory, which stores the program and is distributed to deliver the program to users apart from the apparatus body shown in FIG. 29. The recording medium also includes a hard disk included in the ROM 702 or the storage unit 708 which stores the program and is delivered to users in a state embedded in the apparatus body.

In the specification, the above-described series of processes include not only processes which are chronologically executed in the described order but also processes which are executed in parallel or individually without being necessarily executed chronologically.

Embodiments of the present technology are not limited to the above-described embodiment, but may be modified in various forms within the scope of the present technology without departing from the gist of the present technology.

The embodiment of the present technology may be realized as follows.

(1) An image processing apparatus includes: an image feature outputting unit that outputs each of image features, which are formed as features of a plurality of feature points of images of each frame in data of an input moving image, in correspondence with a time of the frame; a foreground estimating unit that estimates a foreground image at a time s by executing a view transform as a geometric transform on a foreground view model having the image feature of a foreground image in the image as a parameter in regard to the image feature at the time s, and then outputs an estimated foreground view; a background estimating unit that estimates a background image at the time s by executing a view transform as a geometric transform on a background view model having the image feature of a background image in the image as a parameter in regard to the image feature at the time s, and then outputs an estimated background view; a synthesized view generating unit that generates a synthesized view by synthesizing the estimated foreground view and the estimated background view; a foreground learning unit that learns the foreground view model based on an evaluation value obtained by comparison between the synthesized view and the image feature at the time s by updating the parameter of the foreground view model based on a stochastic generation model; and a background learning unit that learns the background view model based on the evaluation value by updating the parameter of the background view model based on a stochastic generation model.

(2) In the image processing apparatus described in (1), the foreground estimating unit and the background estimating unit each calculate a posterior probability of each of a plurality of the view transforms based on the evaluation value, estimate the view transform based on the image feature and the posterior probability, and output the estimated foreground view and the estimated background view, respectively, by executing the view transforms on the view model.

(3) In the image processing apparatus described in (1) or (2), the foreground learning unit and the background learning unit each weight the parameter of the view model subjected to a plurality of the view transforms based on a posterior probability of each of the view transforms calculated based on the evaluation value, and update the parameter of the foreground view model and the parameter of the background view model, respectively, based on the weighted parameter.

(4) In the image processing apparatus described in any one of (1) to (3), the view model is configured as a multi-view model formed by a plurality of view models corresponding to images obtained by viewing one of the foreground and the background at different angles.

(5) In the image processing apparatus described in any one of (1) to (4), one of the foreground view model and the background view model is configured by a multi-view model formed by a plurality of view models corresponding to images obtained by viewing one of the foreground and the background at different angles.

(6) In the image processing apparatus described in (4) or (5), the foreground estimating unit and the background estimating unit each calculate a posterior probability of each of a plurality of the view models based on the evaluation value, estimate the view transform based on the image feature and the posterior probability, and output the estimated foreground view and the estimated background view by executing the view transform on the estimated view model corresponding to transition. One of HMM, FNN, RNN, a particle filter, and a Kalman filter is used as a dynamics learning estimation model used for estimating a prior probability based on view transition in calculation of a posterior probability of the view model.

(7) In the image processing apparatus described in (6), the foreground estimating unit and the background estimating unit each calculate a posterior probability of each of a plurality of the view transforms based on the evaluation value, and estimate the view transform based on the image feature and the posterior probability.

(8) In the image processing apparatus described in (4) or (7), the foreground learning unit and the background learning unit each weight the parameter of the view model corresponding to a plurality of transitions based on a posterior probability of each of the transitions calculated based on the evaluation value, weight the parameter of the view model subjected to a plurality of the view transforms based on a posterior probability of each of the view transforms calculated based on the evaluation value, and update the parameter of the foreground view model and the parameter of the background view model, respectively, based on the weighted parameter.

(9) In the image processing apparatus described in any one of (1) to (8), one of HMM, FNN, RNN, a particle filter, and a Kalman filter is used as a dynamics learning estimation model used for estimating a prior probability based on view transform motion in calculation of a posterior probability of the view transform in the stochastic generation model.

(10) In the image processing apparatus described in any one of (1) to (9), the stochastic generation model used in the foreground learning unit is different from the stochastic generation model used in the background learning unit.

(11) In the image processing apparatus described in any one of (1) to (10), the image feature outputting unit outputs information in which a pixel position and a pixel value of each pixel correspond to each other as the image feature.

(12) In the image processing apparatus described in any one of (1) to (10), the image feature outputting unit outputs a set of feature point positions detected by a Harris corner detection method as the image feature.

(13) An image processing method includes: outputting, by an image feature outputting unit, each of image features, which are formed as features of a plurality of feature points of images of each frame in data of an input moving image, in correspondence with a time of the frame; estimating, by a foreground estimating unit, a foreground image at a time s by executing a view transform as a geometric transform on a foreground view model having the image feature of a foreground image in the image as a parameter in regard to the image feature at the time s, and then outputting an estimated foreground view; estimating, by a background estimating unit, a background image at the time by executing a view transform as a geometric transform on a background view model having the image feature of a background image in the image as a parameter in regard to the image feature at the time s, and then outputting an estimated background view generating, by a synthesized view generating unit, a synthesized view by synthesizing the estimated foreground view and the estimated background view; learning, by a foreground learning unit, the foreground view model based on an evaluation value obtained by comparison between the synthesized view and the image feature at the time s by updating the parameter of the foreground view model based on a stochastic generation model; and learning, by a background learning unit, the background view model based on the evaluation value by updating the parameter of the background view model based on a stochastic generation model.

(14) A program causes a computer to function as an image processing apparatus including: an image feature outputting unit that outputs each of image features, which are formed as features of a plurality of feature points of images of each frame iii data of an input moving image, in correspondence with a time of the frame; a foreground estimating unit that estimates a foreground image at a time by executing a view transform as a geometric transform on a foreground view model having the image feature of a foreground image in the image as a parameter in regard to the image feature at the time s, and then outputs an estimated foreground view; a background estimating unit that estimates a background image at the time s by executing a view transform as a geometric transform on a background view model having the image feature of a background image in the image as a parameter in regard to the image feature at the time s, and then outputs an estimated background view; a synthesized view generating unit that generates a synthesized view by synthesizing the estimated foreground view and the estimated background view; a foreground learning unit that learns the foreground view model based on an evaluation value obtained by comparison between the synthesized view and the image feature at the time s by updating the parameter of the foreground view model based on a stochastic generation model; and a background learning unit that learns the background view model based on the evaluation value by updating the parameter of the background view model based on a stochastic generation model.

(15) A recording medium stores the program described in (14).

The present disclosure contains subject matter related to that disclosed in Japanese Priority Patent Application JP 2011-077696 filed in the Japan Patent Office on Mar. 31, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
an image feature outputting unit that outputs each of image features, which are formed as features of a plurality of feature points of images of each frame in data of an input moving image, in correspondence with a time of the frame;
a foreground estimating unit that estimates a foreground image at a time s by executing a view transform as a geometric transform on a foreground view model having the image feature of a foreground image in the image as a parameter in regard to the image feature at the time s, and then outputs an estimated foreground view;
a background estimating unit that estimates a background image at the time s by executing a view transform as a geometric transform on a background view model having the image feature of a background image in the image as a parameter in regard to the image feature at the time s, and then outputs an estimated background view;
a synthesized view generating unit that generates a synthesized view by synthesizing the estimated foreground view and the estimated background view;
a foreground learning unit that learns the foreground view model based on an evaluation value obtained by comparison between the synthesized view and the image feature at the time s by updating the parameter of the foreground view model based on a stochastic generation model; and
a background learning unit that learns the background view model based on the evaluation value by updating the parameter of the background view model based on a stochastic generation model.

2. The image processing apparatus according to claim 1, wherein the foreground estimating unit and the background estimating unit each:
calculate a posterior probability of each of a plurality of the view transforms based on the evaluation value,
estimate the view transform based on the image feature and the posterior probability, and
output the estimated foreground view and the estimated background view, respectively, by executing the view transforms on the view model.

3. The image processing apparatus according to claim 1, wherein the foreground estimating unit and the background estimating unit each:
weight the parameter of the view model subjected to a plurality of the view transforms based on a posterior probability of each of the view transforms calculated based on the evaluation value, and
update the parameter of the foreground view model and the parameter of the background view model, respectively, based on the weighted parameter.

4. The image processing apparatus according to claim 1, wherein the view model is configured as a multi-view model formed by a plurality of view models corresponding to images obtained by viewing one of the foreground and the background at different angles.

5. The image processing apparatus according to claim 1, wherein one of the foreground view model and the background view model is configured by a multi-view model formed by a plurality of view models corresponding to images obtained by viewing one of the foreground and the background at different angles.

6. The image processing apparatus according to claim 4, wherein the foreground estimating unit and the background estimating unit each:
calculate a posterior probability of each of a plurality of the view models based on the evaluation value,
estimate the view transform based on the image feature and the posterior probability, and
output the estimated foreground view and the estimated background view by executing the view transform on the estimated view model corresponding to transition,
wherein one of a Hidden Markov Model, a Feed Forward Neural Network, a Recurrent Neural Network, a particle filter, and a Kalman filter is used as a dynamics learning estimation model used for estimating a prior probability based on view transition in calculation of a posterior probability of the view model.

7. The image processing apparatus according to claim 1, wherein the foreground estimating unit and the background estimating unit each:
calculate a posterior probability of each of a plurality of the view transforms based on the evaluation value, and
estimate the view transform based on the image feature and the posterior probability.

8. The image processing apparatus according to claim 1, wherein the foreground learning unit and the background learning unit each:
weight the parameter of the view model corresponding to a plurality of transitions based on a posterior probability of each of the transitions calculated based on the evaluation value,
weight the parameter of the view model subjected to a plurality of the view transforms based on a posterior probability of each of the view transforms calculated based on the evaluation value, and
update the parameter of the foreground view model and the parameter of the background view model, respectively, based on the weighted parameter.

9. The image processing apparatus according to claim 1, wherein one of a Hidden Markov Model, a Feed Forward Neural Network, a Recurrent Neural Network, a particle filter, and a Kalman filter is used as a dynamics learning estimation model used for estimating a prior probability based on view transform motion in calculation of a posterior probability of the view transform in the stochastic generation model.

10. The image processing apparatus according to claim 1, wherein the stochastic generation model used in the foreground learning unit is different from the stochastic generation model used in the background learning unit.

11. The image processing apparatus according to claim 1, wherein the image feature outputting unit outputs information in which a pixel position and a pixel value of each pixel correspond to each other as the image feature.

12. The image processing apparatus according to claim 1, wherein the image feature outputting unit outputs a set of feature point positions detected by a Harris corner detection method as the image feature.

13. An image processing method comprising:

outputting, by an image feature outputting unit, each of image features, which are formed as features of a plurality of feature points of images of each frame in data of an input moving image, in correspondence with a time of the frame;

estimating, by a foreground estimating unit, a foreground image at a time s by executing a view transform as a geometric transform on a foreground view model having the image feature of a foreground image in the image as a parameter in regard to the image feature at the time s, and then outputting an estimated foreground view;

estimating, by a background estimating unit, a background image at the time s by executing a view transform as a geometric transform on a background view model having the image feature of a background image in the image as a parameter in regard to the image feature at the time s, and then outputting an estimated background view;

generating, by a synthesized view generating unit, a synthesized view by synthesizing the estimated foreground view and the estimated background view;

learning, by a foreground learning unit, the foreground view model based on an evaluation value obtained by comparison between the synthesized view and the image feature at the time s by updating the parameter of the foreground view model based on a stochastic generation model; and learning, by a background learning unit, the background view model based on the evaluation value by updating the parameter of the background view model based on a stochastic generation model.

14. A non-transitory computer-readable storage medium, storing a computer program, which when executed on a processor, causes the processor to perform an image processing method, the method comprising:

outputting each of image features, which are formed as features of a plurality of feature points of images of each frame in data of an input moving image, in correspondence with a time of the frame;

estimating a foreground image at a time s by executing a view transform as a geometric transform on a foreground view model having the image feature of a foreground image in the image as a parameter in regard to the image feature at the time s, and then outputting an estimated foreground view;

estimating a background image at the time s by executing a view transform as a geometric transform on a background view model having the image feature of a background image in the image as a parameter in regard to the image feature at the time s, and then outputting an estimated background view;

generating a synthesized view by synthesizing the estimated foreground view and the estimated background view;

learning, by a foreground learning unit, the foreground view model based on an evaluation value obtained by comparison between the synthesized view and the image feature at the time s by updating the parameter of the foreground view model based on a stochastic generation model; and learning the background view model based on the evaluation value by updating the parameter of the background view model based on a stochastic generation model.

* * * * *